DEMODULATION APPARATUS FOR PHASE-MODULATED TELEGRAPHIC CODE

Filed June 3, 1963 21 Sheets-Sheet 1

FIG. 9(A)
| POLARITY | | PHASE DIFFERENCE FROM INMEDIATELY PRECEEDING CODE ELEMENT |
|---|---|---|
| Ach | Bch | |
| Ma | Mb | 0° |
| Ma | Sb | $+\pi/2$ |
| Sa | Mb | $-\pi/2$ |
| Sa | Sb | $\pi$ |
FIG. 9(B)
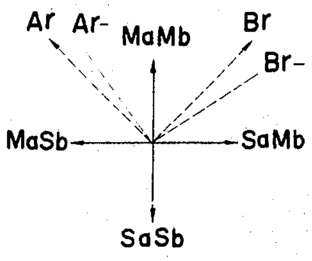
FIG. 9(C)
| POLARITY | | | | | | | | |
|---|---|---|---|---|---|---|---|---|
| POLARITY | Ach | Ma | Sa | Sa | Ma | Ma | Sa | Ma |
| | Bch | Mb | Sb | Mb | Sb | Mb | Sb | Sb |
| PHASE ROTATION OF 4 PHASES MODULATION SIGNAL | | 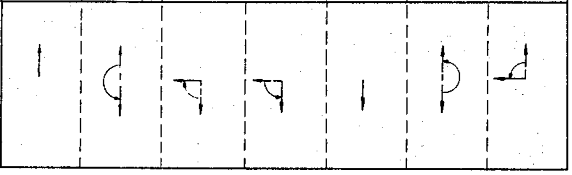 | | | | | | |

| COMBINATION AND PHASE | | | DIFFERENCIATOR OUT-PUT PULSE | | |
|---|---|---|---|---|---|
| COMBINATION | | PHASE DIFFERENCE FROM IMMEDIATELY PRECEDING CODE ELEMENT | A | B | A x B |
| Ma | Mb | 0 | − | − | + |
| Ma | Sb | +π/2 | − | + | − |
| Sa | Mb | −π/2 | + | − | − |
| Sa | Sb | π | + | + | + |

DEMODULATION APPARATUS FOR PHASE-MODULATED TELEGRAPHIC CODE

Filed June 3, 1963 21 Sheets-Sheet 13

DEMODULATION APPARATUS FOR PHASE-MODULATED TELEGRAPHIC CODE
Filed June 3, 1963 21 Sheets-Sheet 14
FIG. 17
| (1) | (2) | (3) | (4) | (5) | (6) | (7) |
|---|---|---|---|---|---|---|
| M M | 0 | – | – | + | | |
| S M | $-\pi/2$ | + | – | – | | – |
| S S | $\pi$ | + | + | + | – | |
| M S | $+\pi/2$ | – | + | – | – | – |
FIG. 18(A)
| COMBINATION OF POLARITIES | | | PHASE DIFFERENCE FROM IMMEDIATELY PRECEDING CODE ELEMENT |
|---|---|---|---|
| A ch | B ch | C ch | |
| M | M | M | 0° |
| M | M | S | -45° |
| M | S | S | -90° |
| M | S | M | -135° |
| S | S | M | 180° |
| S | S | S | +135° |
| S | M | S | +90° |
| S | M | M | +45° |
FIG. 18(B)
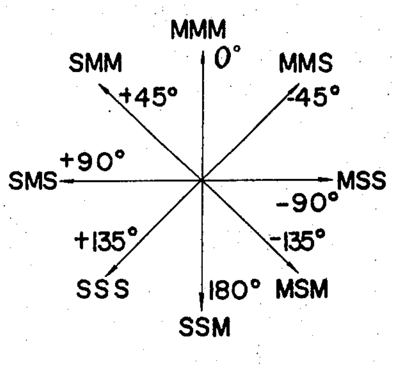
FIG. 19(A)
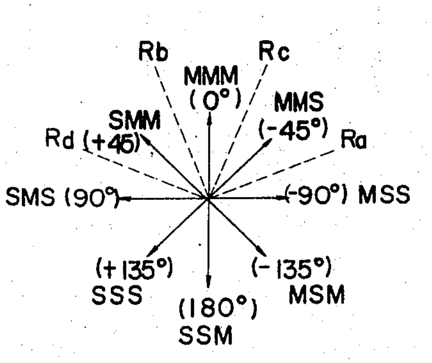

Nov. 14, 1967 KAZUO KAWAI ETAL 3,353,101

DEMODULATION APPARATUS FOR PHASE-MODULATED TELEGRAPHIC CODE

Filed June 3, 1963 21 Sheets-Sheet 15

| PHASE DIFFERENCE FROM IMMEDIATELY PRECEDING CODE ELEMENT | IDEAL COMPONENT TO CONTROL REFERENCE PHASE | THE PHASE OF DEMODULATOR'S DIFFERENTIAL PULSES AND THEIR PRODUCTS | | | | | | |
|---|---|---|---|---|---|---|---|---|
| | | (a) | (b) | (c) | (d) | (ad) | (cd) | (abcd) |
| 0 | d − a | + | + | + | + | + | + | + |
| −45° | d + b | + | + | + | − | + | − | − |
| −90° | c + b | + | − | + | − | − | − | + |
| −135° | c + a | + | − | − | − | − | + | − |
| 180° | −(d − a) | − | − | − | − | + | + | + |
| +135° | −(d + b) | − | − | − | + | + | − | − |
| +90° | −(c + b) | − | + | − | + | − | − | + |
| +45° | −(c + a) | − | + | + | + | − | + | − |

BY 3,353,101
Patented Nov. 14, 1967

3,353,101

DEMODULATION APPARATUS FOR PHASE-MODULATED TELEGRAPHIC CODE

Kazuo Kawai, Nerima-ku, Tokyo-to, and Hiroshi Kurihara, Suginami-ku, Tokyo-to, Japan, assignors to Kokusai Denshin Denwa Kabushiki Kaisha (also known as Kokusai Denshin Denwa Co., Ltd.), Tokyo-to, Japan, a joint-stock company of Japan Filed June 3, 1963, Ser. No. 284,988
Claims priority, application Japan, Dec. 21, 1960, 35/49,439; Dec. 28, 1960, 35/50,417; Dec. 19, 1962, 37/55,987; Jan. 23, 1963, 38/2,441; Feb. 20, 1963, 38/7,451
15 Claims. (Cl. 325—320)

This application is a continuation-in-part of prior application Ser. No. 160,136/1961 filed Dec. 18, 1961, now abandoned, in the name of Kazuo Kawai, and entitled, "Demodulation Apparatus for Phase-Modulated Telegraphic Code."

The present invention relates to a phase-modulated telegraphic signal having multiple phase positions each of which is determined in accordance with the polarity of a telegraphic code or a combination of polarities of a plurality of telegraphic codes to be transmitted and by use of a phase position of an immediately preceding unit code element of reference.

A telegraphic system using a phase-modulated wave, of the type called "Kineplex System" has been recently proposed. According to this system, effects of out-of-synchronization of a demodulating carrier wave caused by fading or cut-off of a signal, and the like have been almost obviated, the out-of-synchronization being the most important problem occurring at the receiving end of a conventional tele-communication system utilizing phase modulation. In the method adopted in the Kineplex System proposed to solve the problem, for example in the case of two phase modulation, mark and space are subjected to phase modulation so as to be, respectively, the same as and the reverse to the phase of the immediately preceding code element, without carrying out conventional modulation such as that in which mark and space are, respectively, subjected to phase modulations of 0° and 180°. The phase of the immediately preceding element is stored in the receiving side in the form of an alternating current; and the phase of the signal of the immediately succeeding code element is detected by using the stored phase. For the purpose of storing, in the form of an alternating current, the phase of the immediately preceding code element until termination of the immediately succeeding code element, two magneto-strictive resonators are used. That is, (1) an input signal is impressed, alternately per code element, on two magneto-striction resonators, (2) the phase of the just preceding element is alternately stored in the resonators which are held at a very high quality factor (Q) by applying a positive feed-back on one magneto-striction resonator on which the input signal is impressed; and the phase of the just succeeding code element stored in the other magnetostriction resonator, in the same manner as above described, is sampled, at a time just prior to termination of the succeeding code element, by utilizing the stored phase of the just preceding code element, whereby detection of a code element is accomplished. Furthermore, at the same time as the termination of the sampling, a negative feed-back is applied on the former magneto-striction resonator in order to stop the resonance of the magnetostriction resonator, and then, immediately, the negative feedback is converted to positive feed-back so as to commence the phase storing. These operations are alternatively repeated as to the two resonators, so that respective code elements are successively detected. These operations, however, have the disadvantage of being very complex. Accordingly, the Kineplex System suffers from various disadvantages such as the necessity of controlling the feed-back quantities of the positive and negative feed-back circuits connected to the magnetostriction resonators to optimum values, the necessity for a timing pulse generator for generating various pulse-trains to be employed for the operation of the circuits, and the necessity of adopting such a complex operation which is subject to errors so that the phase of only the immediately preceding code element has to be stored in the form of alternating-current and, by utilization of the stored phase, the phase of the immediately succeeding element has to be detected. That is, since the stored phase of the immediately preceding code element is determined as the sum of the signal and noise vectors accumulated during the duration of the immediately preceding code element, a phase substantially equal to the correct phase is obtained in the case wherein the signal-to-noise ratio is large. But in accordance with the decrease of the ratio deviations from the correct phase become large. Moreover, since the immediately succeeding code element, which is also disturbed by the noise is demodulated by the vector sum of the signal and noise, the error produced in demodulation, due to the noise component contained in the carrier wave for demodulation, increases in comparison with the ideal Coherent Detection.

An essential object of the present invention is to provide an apparatus having none of the above-mentioned various disadvantages.

According to the invention, there is provided a phase demodulation apparatus for a phase-modulated telegraphic signal having multiple phase positions each of which is determined in accordance with the polarity of a telegraphic code to be transmitted and by use of a phase position of an immediately preceding unit code element of reference. The apparatus comprises a demodulation circuit comprising a phase detector for detecting the magnitude and sign of the difference between phase positions of the telegraphic signal applied from a first terminal means and a reference carrier wave, applied from a second terminal means, of the same frequency as the telegraphic signal. An integrator is provided for integrating a direct-current voltage of an output of the phase detector during every unit code element of the telegraphic signal, thereby producing an integrated signal successively having a plus or minus polarity according to the sign of the difference, and a pulse means for transforming the integrated signal into a pulse signal, obtainable at a third terminal means, of plus or minus polarity successively in accordance with the polarity of the integrated signal. An automatic control circuit produces an alternating-current signal having a stable frequency corresponding to the frequency of the telegraphic signal and a phase memory circuit successively stores every unit code element of the telegraphic signal, the phase position of the immediately preceding unit code element by use of an output signal of the third terminal means. A regulation circuit is inserted between the automatic control circuit and the second terminal means and is controlled by the output signal of the phase memory circuit. The regulation circuit regulates the phase of the alternating-current signal of the automatic control circuit, thereby supplying, to the second terminal means, the reference carrier wave having a phase position synchronized with the phase position of the immediately preceding unit code element, whereby the demodulation circuit generates a correctly demodulated signal corresponding to the telegraphic signal.

The regulation circuit employed in the apparatus of this invention can be arranged before the first terminal means or after the third terminal means as mentioned below.

In the "Kineplex System" previously referred to, this feature of the "Kineplex System" is extended by means of the demodulation apparatus according to this invention, in that a plurality of phase-modulated waves having polyquantum phases are easily and correctly accommodated. This is one of the useful features of this invention.

The plurality of demodulation apparatus may be arranged in parallel for receiving a plurality of phase-modulated telegraphic signals having frequency spacings each of which is equal to the reciprocal of each integration during T of the integrator of the phase detection circuit.

The timing pulses of the integrator of the phase detection circuit may be produced by utilizing timing information transmitted through one of the above-mentioned plurality of phase-modulated telegraphic signals having a frequency spacing which is equal to the reciprocal of each integration during T of the integrator of the phase detection circuits.

The novel features of this invention are set forth with particularity in the appended claims. This invention, however, both as to its construction and operation together with further advantages thereof, may best be understood by reference to the following description, taken in connection with the accompanying drawings, in which:

FIGS. 1(A), 1(B), and 1(C) are wave diagrams for describing phase modulation of two-quantum phases which are to be employed to transmit a telegraphic signal of one communication channel;

FIG. 2 is a block diagram for showing one embodiment of this invention which is adapted to demodulate a telegraphic signal having two-quantum phases as shown in FIG. 1;

FIGS. 3(A), 3(B) and 3(C) are block diagrams schematically to illustrate the constitution of the demodulation apparatus according to this invention;

FIGS. 4(A) and 4(B) are wave diagrams used to describe the operation of the demodulation device shown in FIG. 2;

FIG. 5 is a block diagram of another embodiment of this invention which is adapted to demodulate a telegraphic signal having two quantum phases shown in FIG. 1;

FIGS. 6(A) and (B) are wave diagrams used to describe the operation of the demodulation device of the embodiment shown in FIG. 5;

FIG. 7 is a block diagram for showing a further embodiment of this invention which is adapted to demodulate a telegraphic signal having two-quantum phases shown in FIG. 1;

FIGS. 8(A) and 8(B) are wave diagrams used to describe the operation of the demodulation device of the embodiment shown in FIG. 7;

FIGS. 9(A), 9(B) and 9(C) are respectively, a table, a vector diagram and a table for describing the manner of phase modulation of four-quantum phases, which is adapted to transmit telegraphic signals of two communication channels by a single carrier wave;

Figure 14:
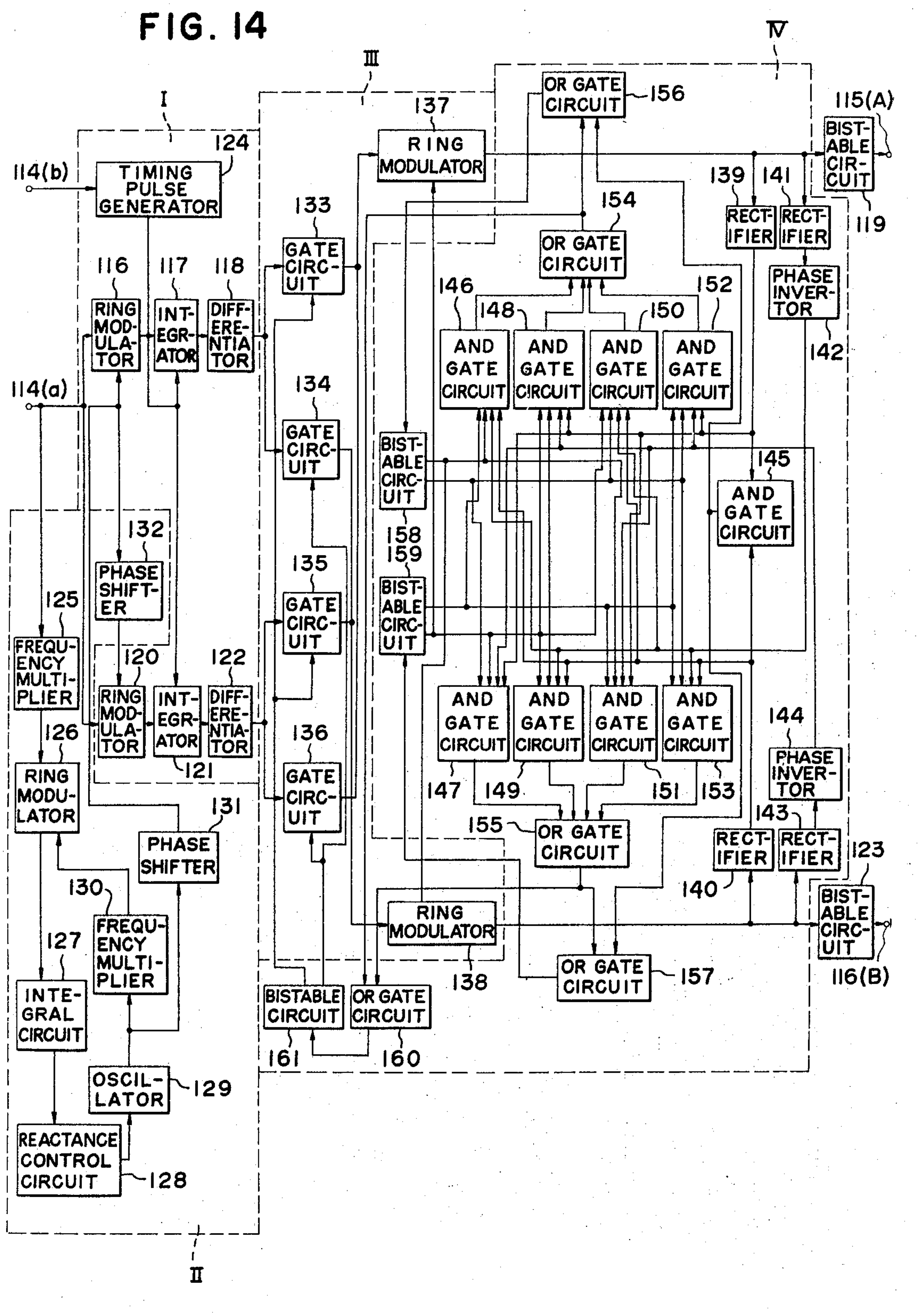
FIG. 14 is a block diagram of a further embodiment of this invention, which is adapted to demodulate a phase-modulated telegraphic signal having four-quantum phases shown in FIG. 9.
Figure 16:
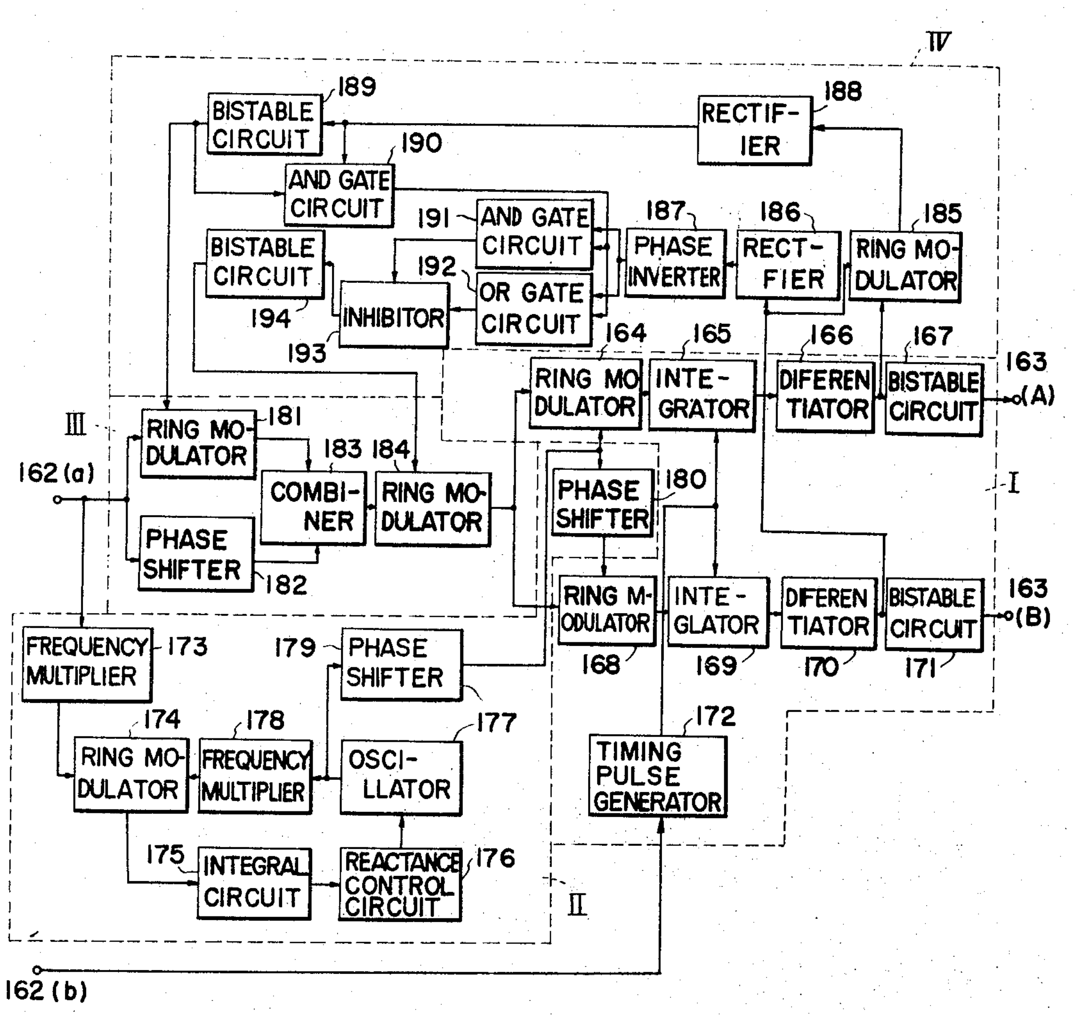
Figure 21:
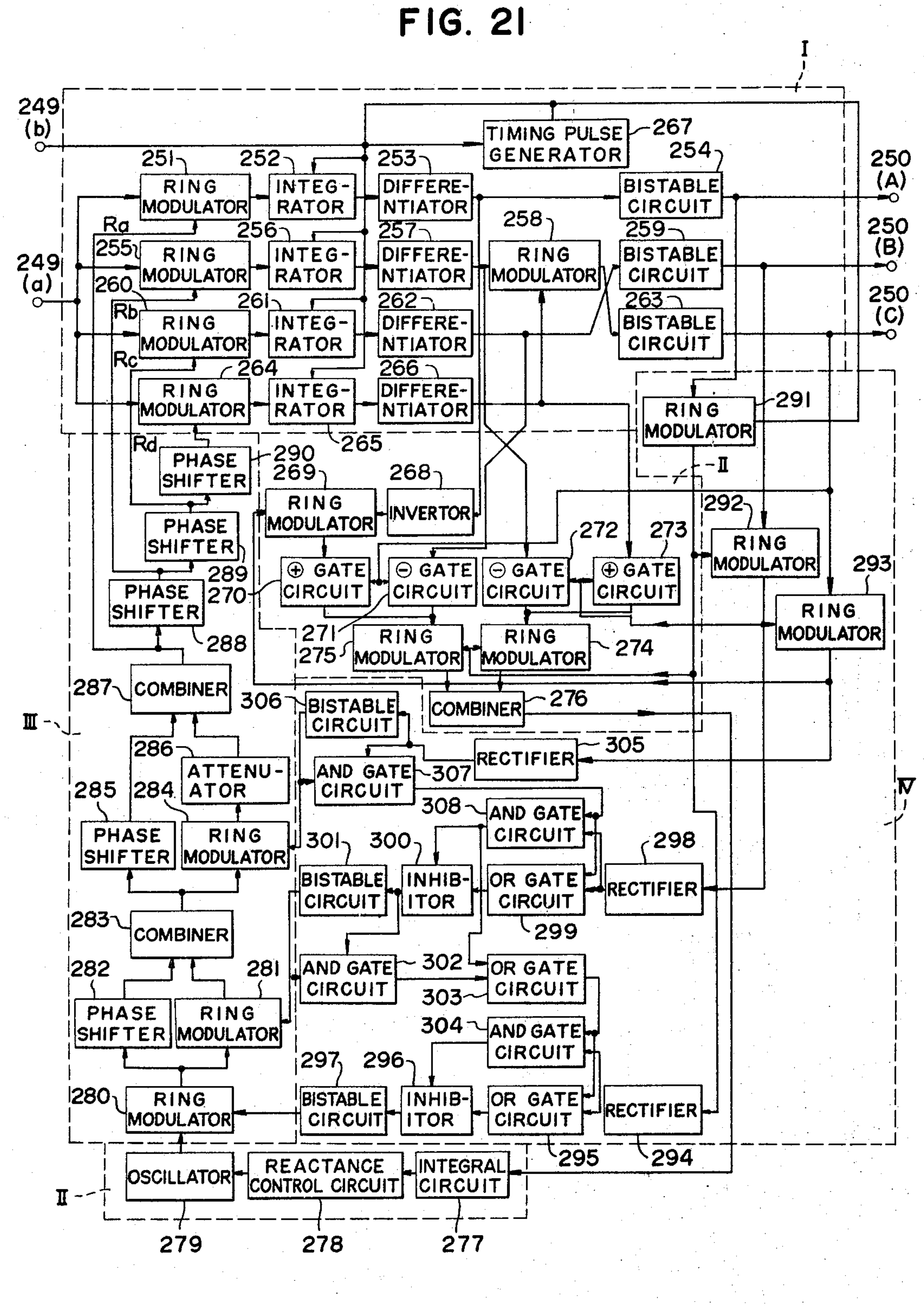
Figures 19B, 22:
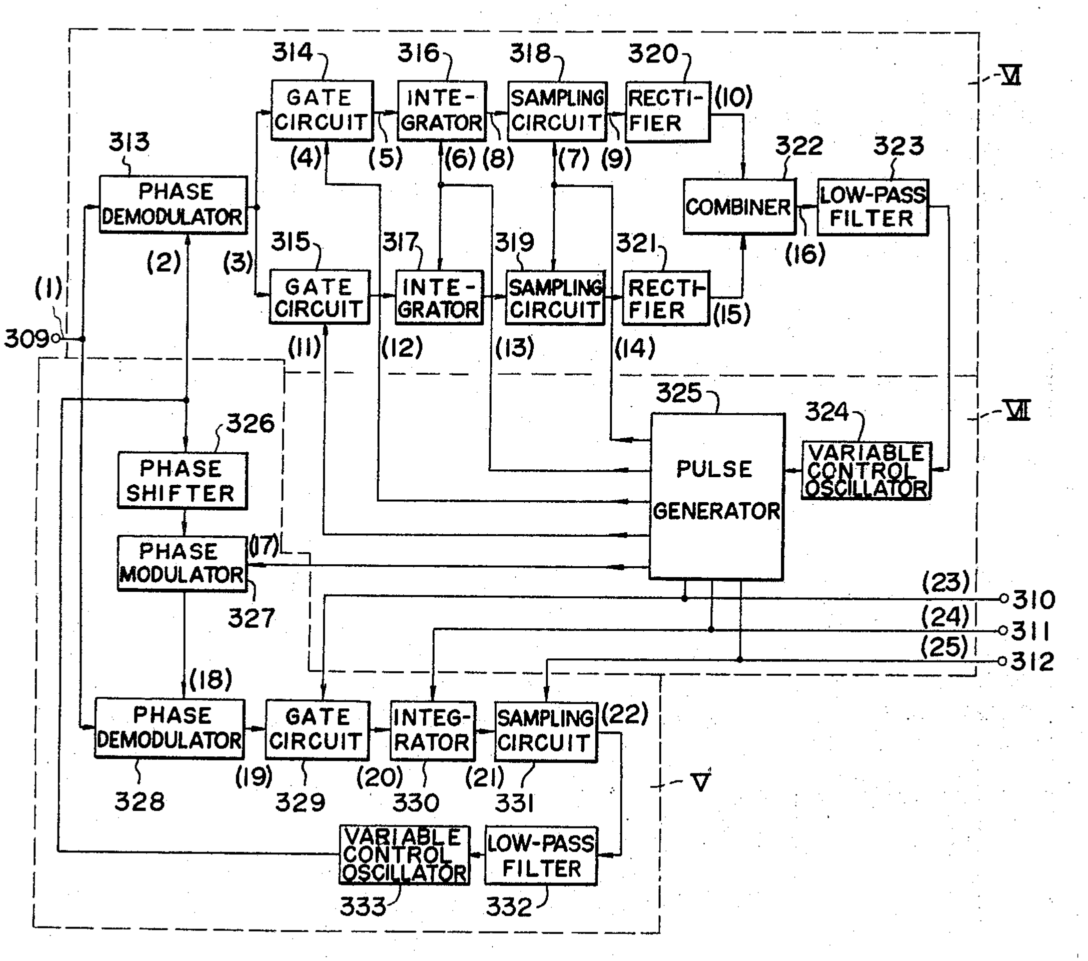
Figure 20:
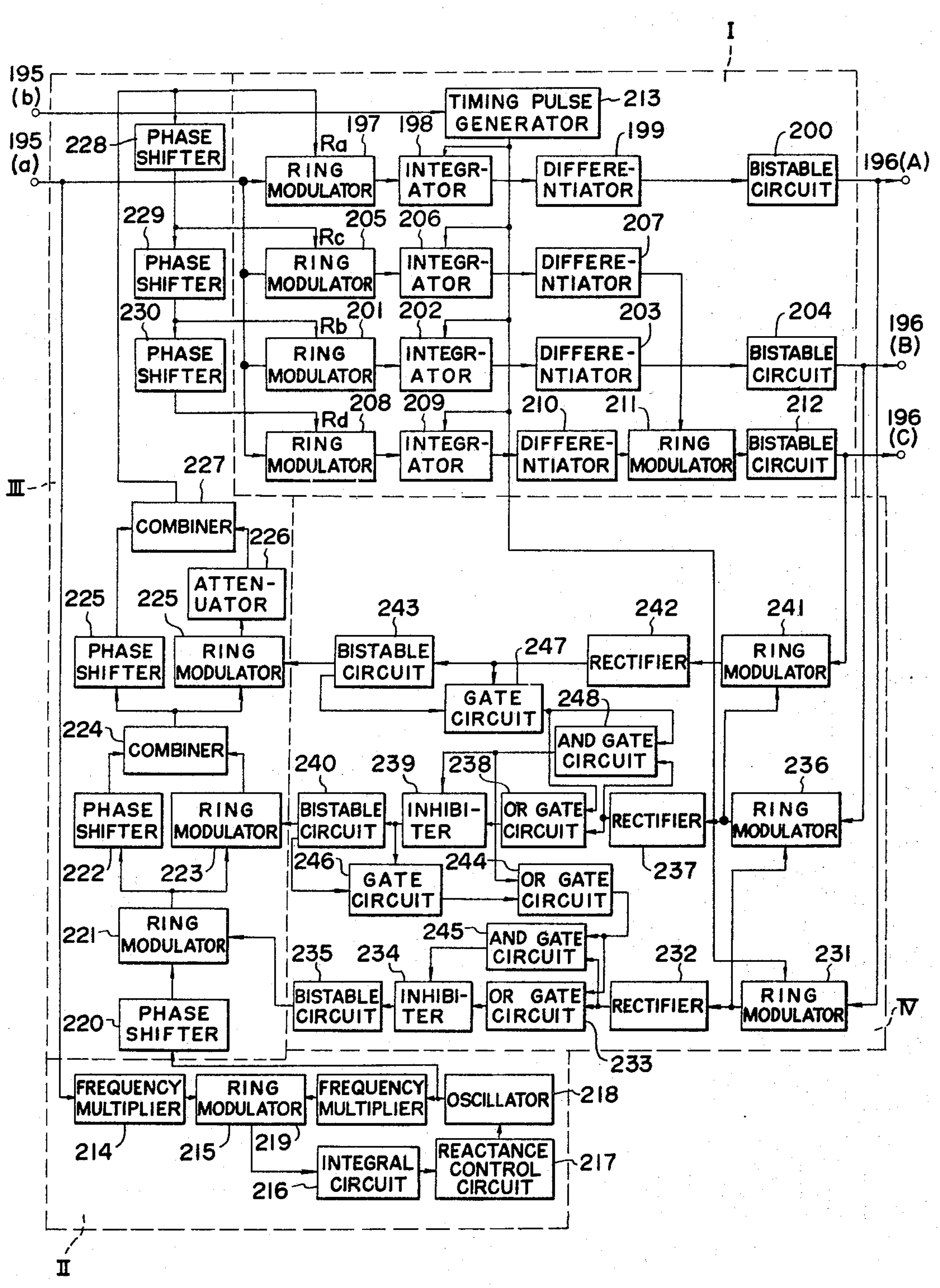
Figure 23A:
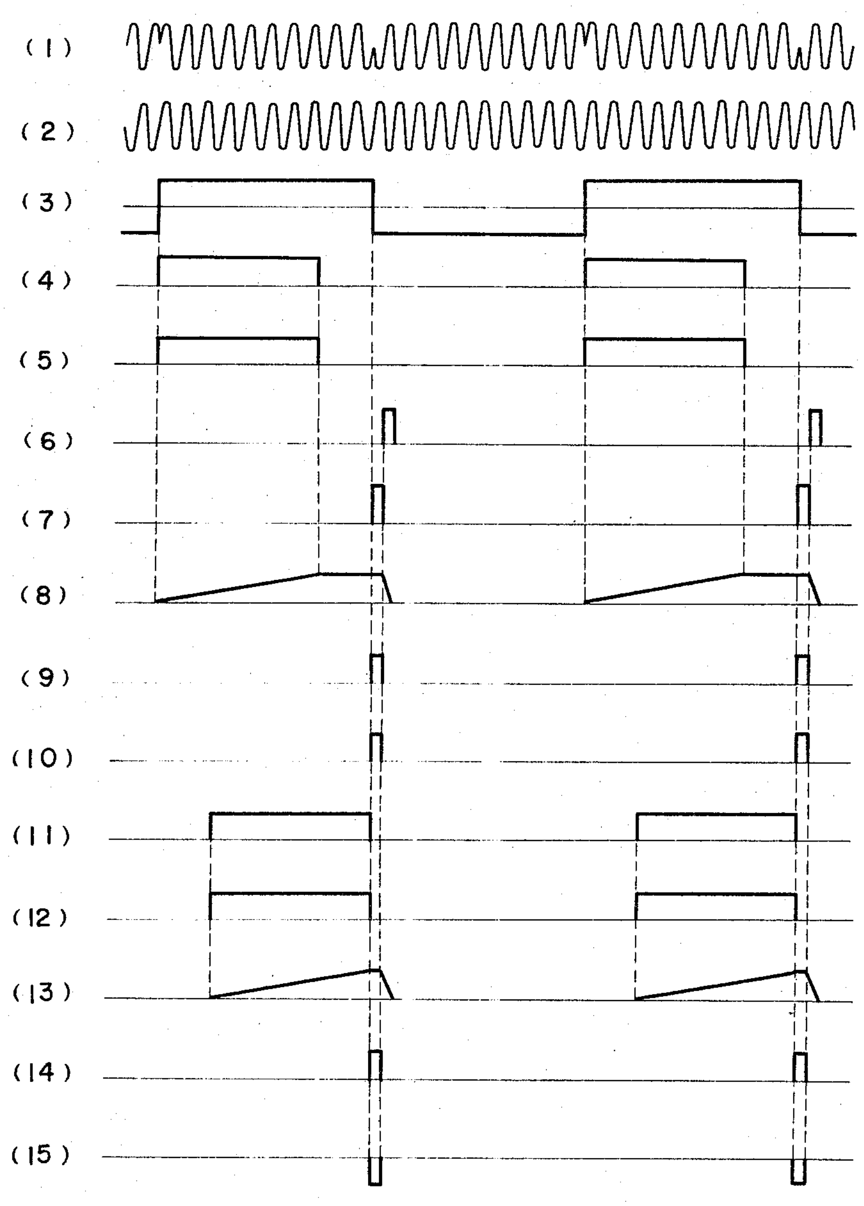
Figure 23B:
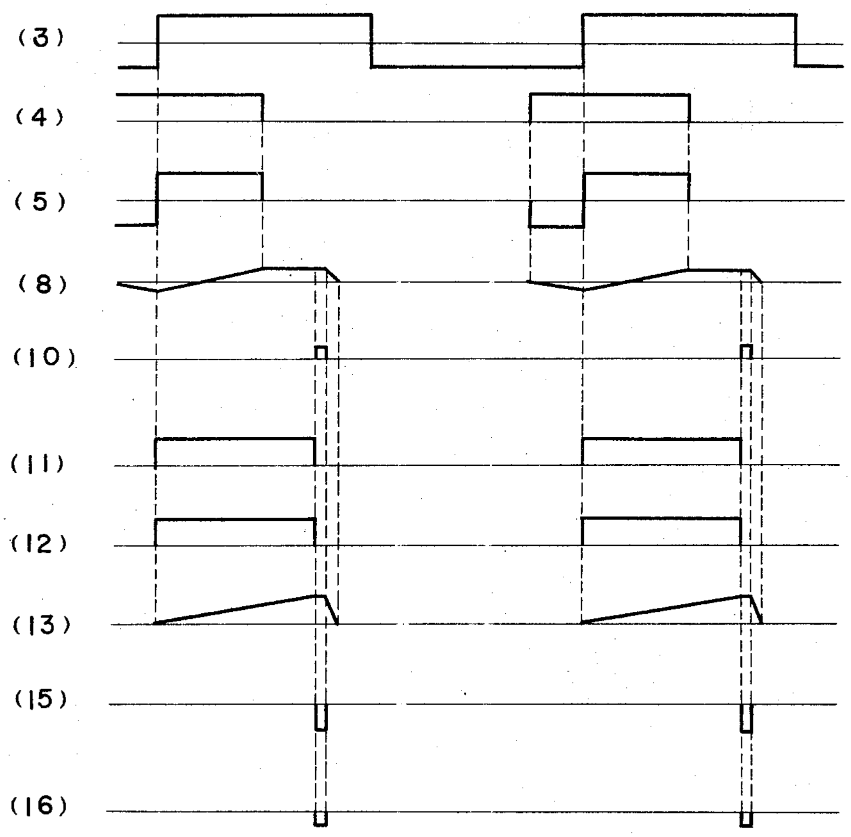
Figure 23C:
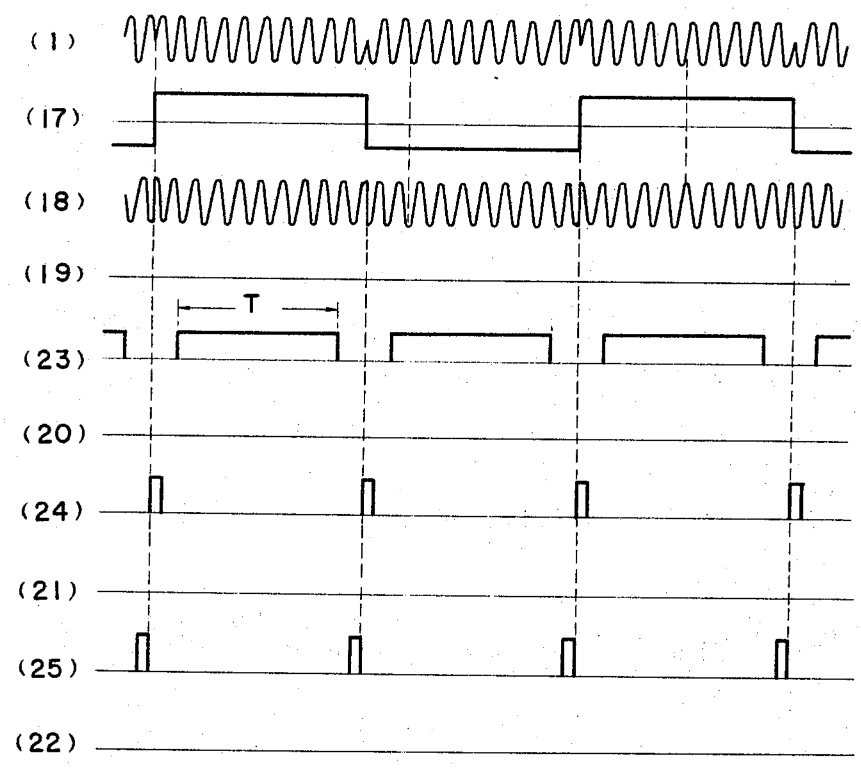
Figure 23D:
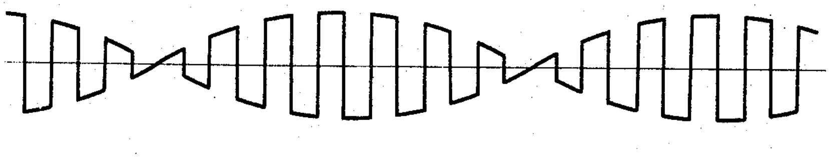
Figure 24A:
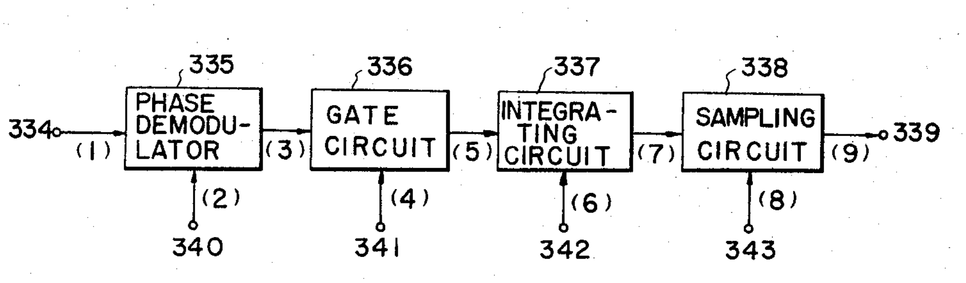
Figure 24B:
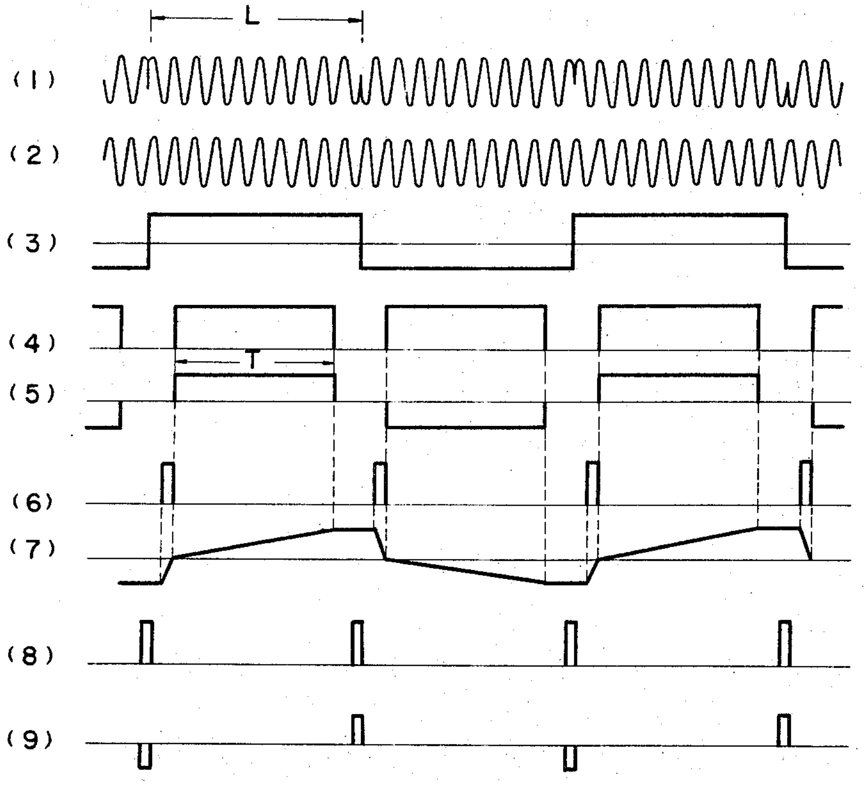

FIGS. 15(A), 15(B), 15(C) and 15(D) are tables used to describe the operation of the embodiment shown in FIG. 14;

FIG. 16 is a block diagram of another embodiment of this invention, which is adapted to demodulate a phase-modulated telegraphic signal having four quantum-phases shown in FIG. 9;

FIG. 17 is a table used to describe the operation of the embodiment shown in FIG. 16;

FIGS. 18(A) and 18(B) are, respectively, a table and a vector diagram used to describe the manner of phase-modulation of eight-quantum phases, which is adapted to transmit telegraphic signals of three communication channels by a single carrier wave;

FIG. 19(A) is a vector diagram used to describe the demodulation operation of a phase-modulated wave shown in FIG. 18;

FIG. 19(B) is a table used to describe the operation of the automatic control circuit in an embodiment shown in FIG. 21;

FIGS. 20 and 21 are embodiments of this invention to be used for demodulating a wave having multiple phases shown in FIGS. 18(A) and (B);

FIG. 22 is a block diagram of a device, according to this invention, for producing a timing pulse signal to be employed in a demodulation apparatus of this invention;

FIGS. 23(A), 23(B), 23(C) and 23(D) are wave diagrams used to describe the operation of a device as shown in FIG. 23; and FIGS. 24(A) and 24(B) are, respectively, a block diagram and a wave diagram for describing the detail constitution and operation of integrators in the demodulation circuit according to this invention.

The demodulation apparatus of this invention will be first described in connection with the case in which two-phase modulation is carried out in order to transmit a telegraphic signal of one communication channel.

FIGS. 1(A), (B) and (C) show a phase-modulated telegraphic signal to be transmitted in this case. That is, FIG. 1(A) shows a telegraphic code to be transmitted, in which the upper side and the lower side with respect to a base line are assumed to be, respectively, mark (M) and space (S), and the numerals 1, 2, 3, 4, 5, 6 and 7 represent respective code elements. In this modulation method, as described above, phase modulation is carried out in such a manner that mark (M) and space (S) assume two-quantum phases which are, respectively, the same as and the reverse to the phase of the immediately preceding element. Accordingly, in order to obtain a phase-modulated wave such that its phase is determined and conforms to the above-mentioned rule, a direct current signal such as shown in FIG. 1(B) is first formed by discriminating the polarity of each code element in its centering instant, whereby a desirable phase-modulated wave having two quantum phases such as shown in FIG. 1(C) is obtained. The numerals of FIG. 1(C) correspond, respectively, to the code elements having the same numerals as shown in FIG. 1(A).

Figure 2:
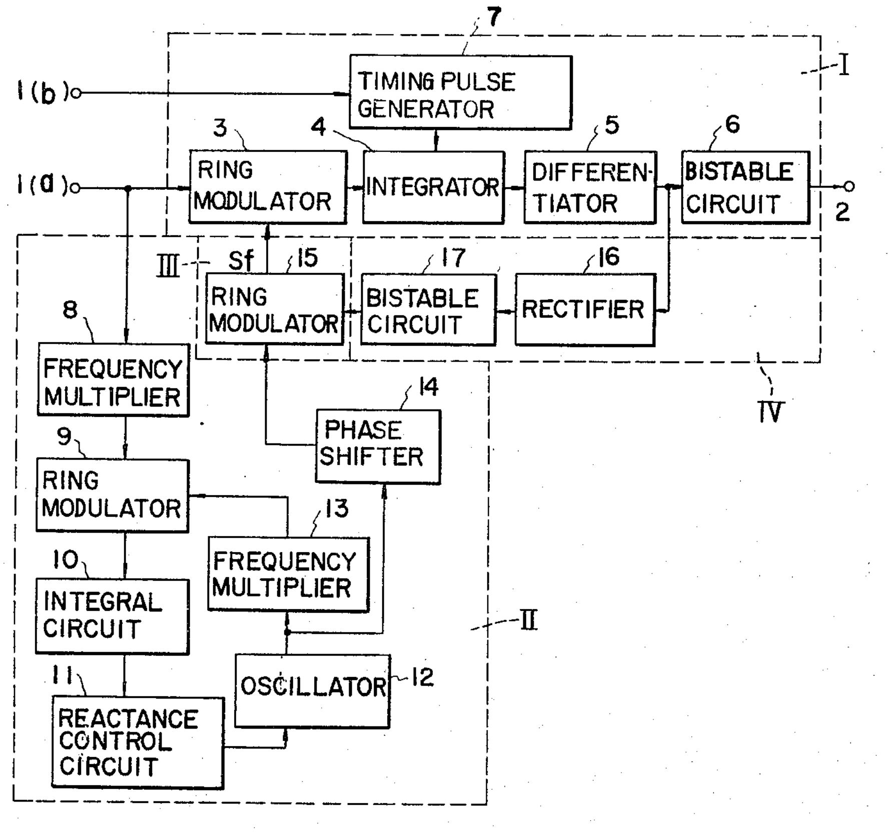

An embodiment of the demodulation apparatus of this invention which is adapted to demodulate the above two-phase modulated waves is shown in FIG. 2. Referring to FIG. 2, the apparatus is provided with a signal input terminal 1(*a*), an output terminal 2 for the demodulated code, and an input terminal 1(*b*) for applying a synchronous pulse which is supplied commonly with respect to the equipment in the case wherein one multiple communication channel is provided in parallel to the communication channel.

Figure 3A:
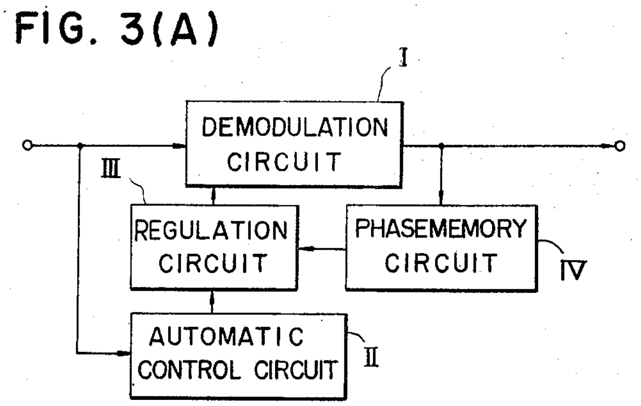

This apparatus can be generally separated into a demodulation circuit I, an automatic phase control circuit II, a regulation circuit III, and a phase memory circuit IV, which are enclosed by dotted lines in each figure showing the embodiment of the present invention. These circuits are shown in FIGS. 3(A), (B) and (C) for the sake of making the circuits more understandable.

Figure 1:
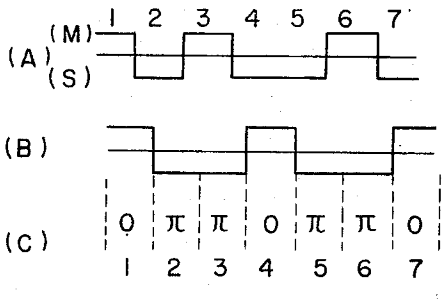

A demodulation apparatus of the type illustrated schematically in FIG. 3 (A) is first described with reference to FIG. 2. For a description of the automatic phase control circuit II, it will now be assumed that such a phase-modulated signal containing no noise as is shown in FIG. 1(*c*) is applied to the input terminal 1(*a*). The frequency of this signal is multiplied by the number of its quantum phases in a frequency multiplier 8 thereby being converted to a signal having a stable phase position. Said converted signal is then applied to a ring modulator 9 the output signal of an oscillator 12 having the same frequency as that of the input signal received is also doubled in its frequency by a frequency multiplier 13 and then applied to the ring modulator 9. In this ring modulator 9, a direct current corresponding to the difference between the phase positions of the above-mentioned input signals is produced, and the output of the modulator 9 is integrated by an integrator 10 and is introduced into a reactance control circuit 11, whereby the phase of the oscillation frequency can be controlled. The loop of the automatic phase control circuit II is designed so as to be stable when the phase difference between the two inputs of the ring modulator 9 is $\pi/2$, that is, the phase difference between the input signal received and the output signal of the oscillator 12 is $\pi/4$. The operation principle of the loop of the automatic phase control circuit II is substantially the same as that of the automatic frequency control circuit which is generally used in the conventional television receiver.

The demodulation operation of an assembly composed of the regulation circuit III, the demodulation circuit I, and the phase memory circuit IV will be described below. Generally speaking, the regulation circuit III is a circuit producing a reference standard carrier wave S*f* for demodulation while being controlled by the phase memory circuit IV by the use of the output of the automatic phase control circuit II; the demodulation circuit I is a circuit for demodulating the input signal by the use of the above-mentioned reference standard carrier wave S*f*; and the phase memory circuit IV is a circuit for controlling the regulation circuit while discriminating polarity of the code element which has been demodulated, thus making the regulation circuit III produce a reference standard carrier wave S*f* having the same phase as that of the said immediately preceding code element.

Figure 4A:
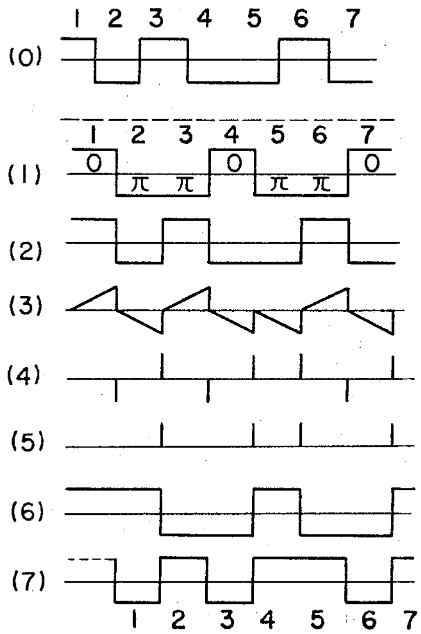

The demodulating operation of this embodiment will be described in connection with FIGS. 4(A) and (B). The output of the oscillator 12 is shifted in its phase by $\pi/4$ or $3\pi/4$ by means of a phase shifter 14 so as to have a phase which is the same as or reverse to that of the input signal and then applied to a ring modulator 15. This ring modulator 15 is controlled by a bistable circuit 17 and sends out its input signal from the phase shifter 14 in the same phase position as the reverse phase position to the input signal to the output. Accordingly, the output of the ring modulator 15, that is, the reference standard carrier wave S*f* for demodulation becomes 0 phase or $\pi$ phase. The bistable circuit 17 has a characteristic of making the phase of the reference standard carrier wave S*f* reverse per pulse fed to it. On the other hand, such a phase-modulated input signal as shown by (1) in FIG. 4(A) is being applied to the ring modulator 3. A wave (0) in FIGS. 4(A) and (B) represents an original signal of the transmission side and is the same as the wave (A) in FIG. 1. Now, when it is assumed that the polarity of the reference standard carrier wave S*f* corresponds to 0 phase, the phase of the first code element 1 of the input signal (1) in FIG. 4(A) corresponds to the phase of the said wave S*f*, whereby the output of the ring modulator 3, the output corresponding to the wave (2) of FIG. 4(A), becomes positive voltage. This voltage is applied to the integrator 4, whereby the output of the integrator 4 assumes a form as is shown by wave (3) of FIG. 4(A) because the integrator 4 is controlled by an output pulse of a timing pulse generator 7 which is synchronous to the synchronous pulse from the terminal 1(*b*). The integrator 4 is then reset application of the pulse. The integrator 4 continues repeatedly its integrating operation until the next pulse comes thereinto. The wave form of this output is further differentiated by a differentiator 5 and becomes a differentiated pulse such as is shown by a wave (4) of FIG. 4(A). As is clear from the relative relation between the waves of FIG. 4(A), when the output wave (2) of the ring modulator 3 is positive in voltage, the differentiator 5 produces a pulse having a negative polarity at the termination of the code element, and when the output wave (2) is negative in voltage, the differentiator 5 produces a pulse having a positive polarity. That is, in the first code element, a pulse having negative polarity is produced at the termination of the first code element. Since the rectifier 16 is arranged so as to allow a pulse having a positive polarity to pass therethrough, the aforesaid pulse of negative polarity does not pass through the rectifier 16 whereby the state of the bistable circuit 17 is not reversed. The waves (5) and (6) in FIG. 4(A) correspond respectively, to waves indicating the outputs of the rectifier 16 and the bistable circuit 17. When the bistable circuit 17 does not reverse its state, the carrier wave from the phase shifter 14 which has been applied to the ring modulator 15 does not vary in its phase and is introduced into the ring modulator 3 in the state of 0 phase to become the carrier wave S*f*. Since the phase of the second code element 2 is $\pi$ phase, the operating waveforms of various parts relative to the input code element 2 become such waveforms corresponding to the code element 2 in FIG. 4(A), whereby the bistable circuit 17 reverses its state, and the phase of the reference standard carrier wave S*f* becomes $\pi$ phase. The third code element 3 is introduced in the state of $\pi$ phase. However, this code element 3 is in the same phase as that of the reference standard carrier wave S*f*, so that the bistable circuit 17 does not reverse its state, thus maintaining the phase of the carrier wave S*f* at $\pi$ phase. The phase of the fourth code element 4 is 0 phase and is reverse to that of the carrier wave S*f*, so that the output of the ring modulator 3 produces a negative voltage, and the output of the differentiator 5 becomes a pulse of positive polarity, whereby the bistable circuit 17 is reversed. The following operations are successively carried out as are shown in the other successive waves of FIG. 4(A). Since the bistable circuit 6 is controlled by the output pulse of the differentiator 5, such an output wave as shown by (7) of FIG. 4(A) is produced. The bistable circuit 6 is so designed that its state can be reversed by a pulse the polarity of which is different from that of an immediately preceding pulse. The produced output wave has a phase lag corresponding to 1.5 times the duration of a code element in comparison with the original signal ((0) of FIG. 4(A)) and has a reversed polarity, but it is clearly apparent that demodulation of the input information has been attained without any error. Of course, a correct signal polarity which coincides with the polarity of the input signal can be obtained from another output terminal of the bistable circuit 6.

Figure 4B:
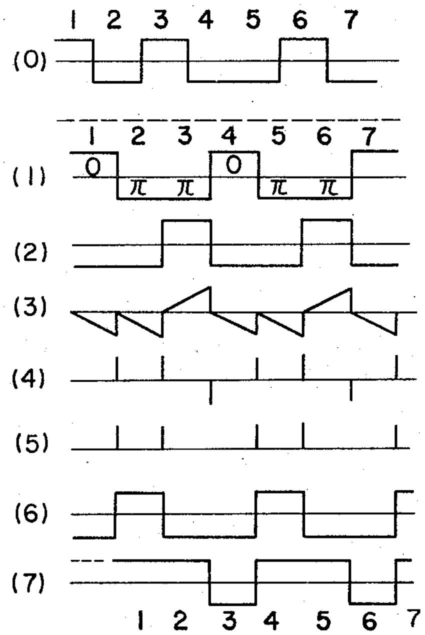

If the phase of the carrier wave of the input side of the ring modulator 15 is 0 phase and an input signal is introduced when the bistable circuit 17 is in a reversed state and the phase of the reference standard carrier wave S*f* is $\pi$ phase, the wave forms of various parts become as shown by (1), (2) . . . (6), (7) in FIG. 4(B); that is, the demodulation of the first code element only is incorrect, but demodulations of the second, third and following code elements are correct.

In the above description, the phase of the carrier wave at the input side of the ring modulator 15 has been assumed to be 0 phase but there are cases in which the said phase is $\pi$. In the case of $\pi$ phase, there are normal or reverse cases in accordance with the condition as to whether the bistable circuit 17 is in the normal or reverse state. The demodulated output in this case is represented by a wave (7) of FIG. 4(A) or (7) of FIG. 4(B).

In the above-mentioned four cases, only the demodulation of the first code element becomes incorrect even in the worst case, but all of the successively following code elements are correctly demodulated.

In the above description, the differentiator 5 is employed for translating the output signal of integrator 4 into a pulse signal. However, this differentiator 5 can be replaced by a sampling circuit for carrying out the same function. In this case, the polarity of the rectifier 16 is reversed.

Considering now the fluctuation of the phase of a phase-modulated telegraphic wave, occurring in the transmission path from a transmission equipment to the demodulation device of a receiving equipment and the velocity of the variation are much slower than the keying speed of the code elements so that by the use of an automatic phase control loop it is possible to follow the variation and correct the phase thereof. Furthermore, even in the case in which the signal-to-noise ratio is small, the phase of the output of the automatic phase control loop can be maintained in an extremely stable state by the integrating operation of the integrator 10, whereby a correct reference standard carrier wave S*f* is always obtained.

Figure 3B:
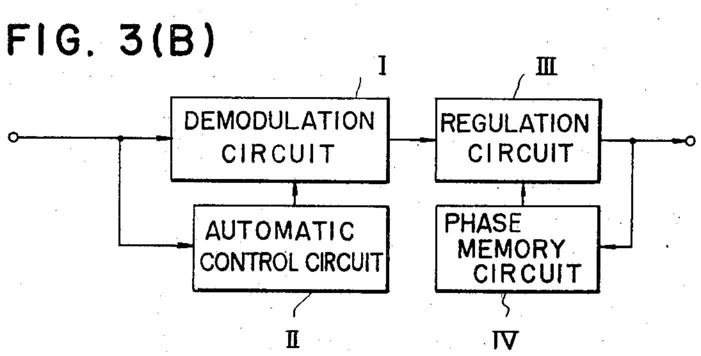
Figure 5:
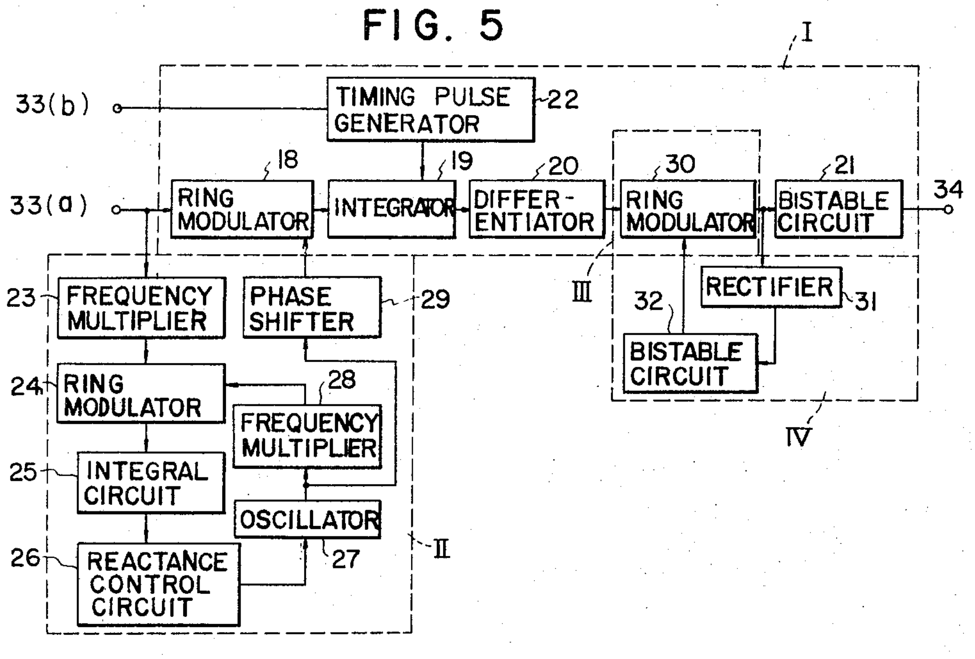

A demodulation apparatus illustrated schematically in FIG. 3(B) will be next described. Another embodiment of this invention in which a two-phase phase-modulated telegraphic wave is used for transmitting the above-mentioned telegraphic signal of one communication channel is to be received is shown in FIG. 5. This embodiment consists of a demodulation circuit I, an automatic phase control circuit II, a regulation circuit III and a phase memory circuit IV, which are enclosed by dotted lines. In the embodiment of FIG. 2, the reference standard carrier wave S*f* is produced by controlling the phase of the output wave of the circuit II in a ring modulator 15, and demodulation is carried out by the use of said carrier wave S*f*. However, in the embodiment of FIG. 5, the phase detection of a received signal is first carried out by a standard carrier wave S*c* the frequency of which is equal to that of the said received signal, and the phase of which is constant, and then correct phase-demodulation is carried out by referring the phase of the immediately preceding code element. In other words, the regulation circuit II controls the output information of the demodulation circuit I. The elemental circuits I, II, III and IV are substantially the same as those of the foregoing embodiment of FIGS. 2 and 3(A), but the combination of the the circuits is somewhat different from that of the embodiment of FIGS. 2 and 3. Accordingly, the operation of the embodiment of FIG. 5 differs somewhat from that of the embodiment of FIG. 2.

Figure 6A:
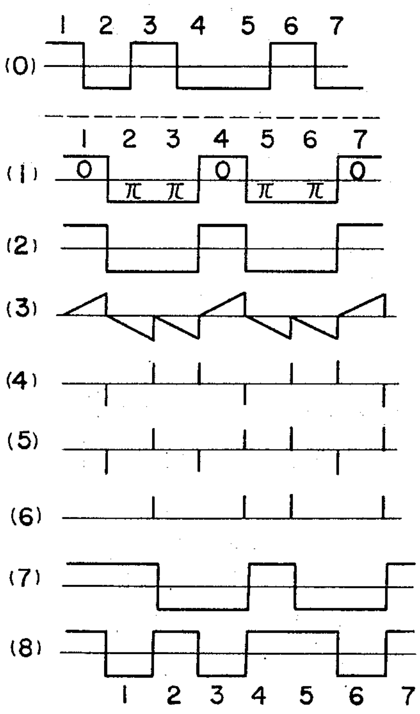
Figure 6B:
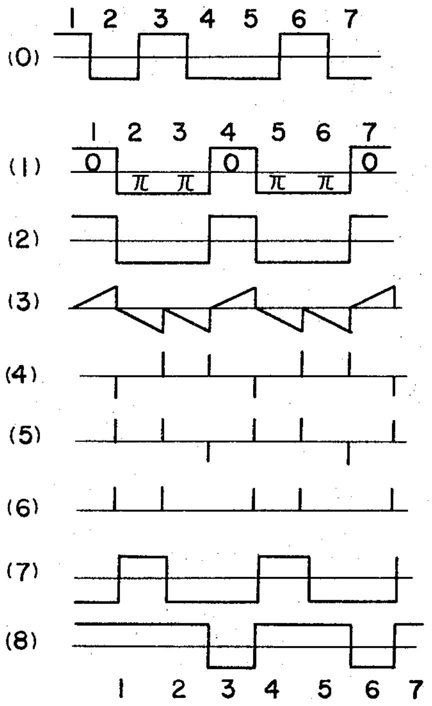

Since the operation of the circuit II in FIG. 5 is exactly the same as that of the circuit II of FIGS. 2 and 3(A), description of this operation is emitted. Referring to FIGS. 6(A) and 6(B), a phase-modulated telegraphic wave (1) corresponding to an original signal (0) is impressed on an input terminal 33(*a*). In the case of FIG. 6(A), since the phase of the carrier wave S*c* is 0 (zero) phase, such a detected wave as shown by (2) is produced at the output side of the ring modulator 18. This detected wave is integrated per code element by means of an integrator 19 which is controlled by the output pulse of a timing pulse generator 22, the output pulse being made to be synchronous with the timing pulse which has been applied to the terminals 33(*b*), whereby an integrated wave (3) is obtained. Accordingly, a differentiated pulse train (4) is produced in the differentiator 20. This pulse train (4) passes through a ring modulator 30. The ring modulator 30 is controlled by a bistable circuit 32 which in turn is controlled by the output pulse of a rectifier 31 through which only a pulse having (+) polarity among the output pulses of the ring modulator 30 passes. The waves (5), (6) and (7) represent, respectively, the output pulse train of the ring modulator 30, the output pulse train of the rectifier 31 and the output wave of the bistable circuit 32. FIG. 6(A) corresponds to the case in which the phase of the bistable circuit 32 is initially set in the normal state. Accordingly, a pulse having (—) polarity at the termination of the first code element passes through the ring modulator 30, but cannot pass through the rectifier 31 because of its (—) polarity, so that the bistable circuit 32 is not reversed. At the termination of the second code element, a pulse having (+) polarity is produced. This pulse also passes through the circuits as described above, then passes through the rectifier 31 because of its (+) polarity, whereby the bistable circuit is reversed. The output of the bistable circuit 32 is connected to the ring modulator 30 through a simple smoother circuit so that the phase of the output lags slightly the pulse which is controlled thereby in the ring modulator 30. Accordingly, the differentiated pulse assuming (+) polarity at the termination of the third code element becomes a pulse having (—) polarity by passing through the ring modulator 30. Since the polarity of this pulse is (—), the polarity of the bistable circuit 32 does not vary.

The differentiated pulse assuming (—) polarity at the termination of the fourth code element becomes a pulse having (+) polarity by passing through the ring modulator 30, whereby the bistable circuit 32 is reversed. In the same manner as described above, such an output pulse train of the ring modulator as shown by (5) can be obtained, and when the bistable circuit 21 is made to operate by the said pulse train (5), a demodulated signal (8) is produced at the output terminal 34. This signal 8 is reverse in its polarity to that of the original signal (0) and lags by about 1.5 times the duration of a code element relative to the said signal (0) similarly to the above-mentioned case. However, it will be apparent that correct demodulation can be obtained without accompaniment of any error. Furthermore, it is possible also to obtain a correct demodulated output having polarities which coincide with that of the original by taking out the said demodulated output from the other output side of the bistable circuit 21.

FIG. 6(B) relates to the case in which the phase of the reference standard carrier wave S*c* is 0 phase and the apparatus starts from the state in which the bistable circuit is in the reversed state. In this case, demodulation of the first code element is incorrect, but demodulations of the other successive code elements are correct.

When the differentiator 20 is replaced by a sampling circuit, the rectifier 31 is reversed in its polarity.

Figure 3C:
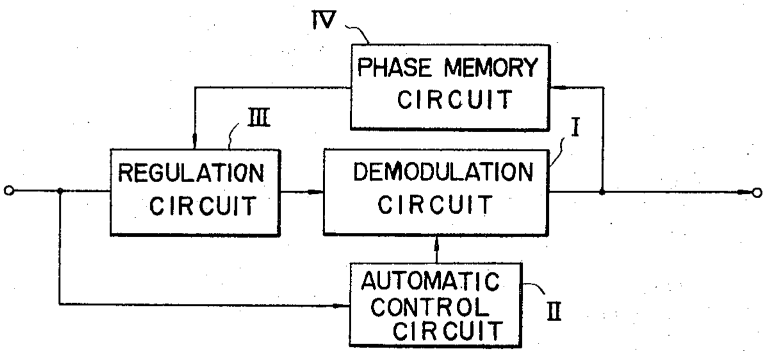
Figure 7:
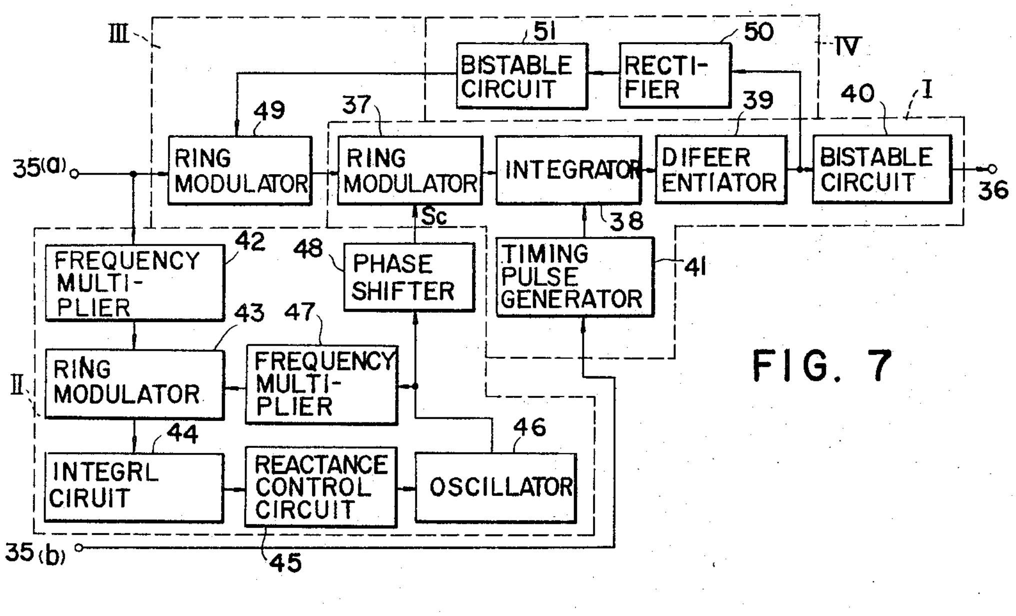

In this and following paragraphs, a demodulation apparatus illustrated schematically in FIG. 3(C) and particularly in FIG. 7 is described. In this embodiment, which also comprises elemental circuits I, II, III and IV mentioned-above, an input telegraphic signal is first translated to a signal which is modulated in such a state that mark and spaced code elements, respectively, correspond to "0 phase" and "$\pi$ phase," and are then correctly demodulated by the use of a carrier wave having a constant phase.

Figure 8A:
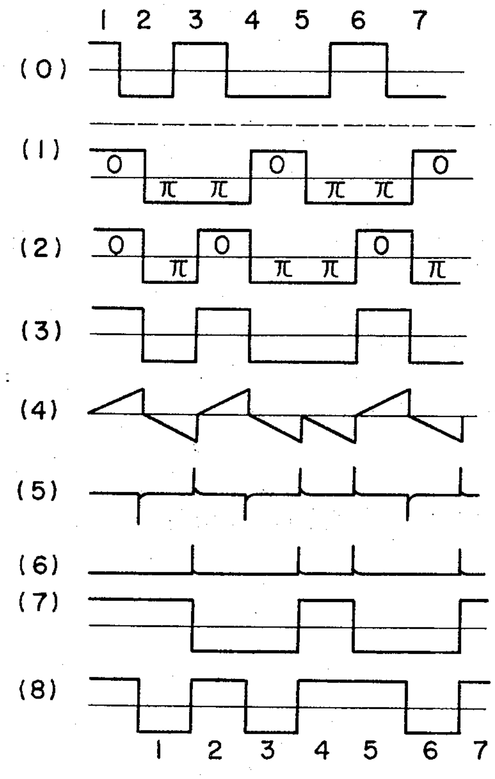
Figure 8B:
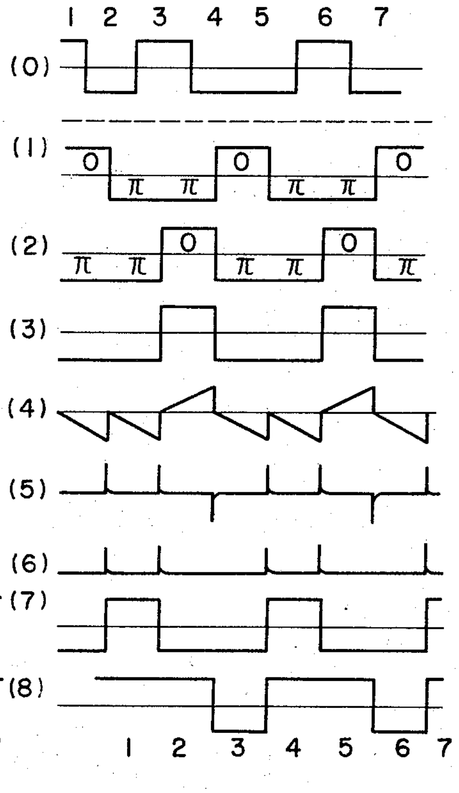

The operation of the circuit II is the same as those of the circuits II in FIGS. 2 and 5. Other details of operation are described referring to FIGS. 8(A) and 8(B). A phase modulated telegraphic wave (1) corresponding to an original signal (0) is impressed on an input terminal 35(*a*). (FIG. 8(A) corresponds to the case wherein the detection starts from the normal state of bistable circuit 51, and FIG. 8(B) corresponds to the case wherein the detection starts from the reverse state of the bistable circuit 51.) The wave (1) is phase-modulated in a ring modulator 49 by the output signal of the phase memory circuit IV so that the wave (1) passes therethrough in the same phase or after the phase modulation into the reverse phase. It depends on the state of the bistable circuit 51 whether it passes in the same phase or not. The output signal (2) of the ring modulator 49 is applied to a ring modulator 37 which carries out the phase detection by the use of the carrier wave Sc supplied from the circuit II. The detected signal (3) is then integrated in an integrator 38 which is controlled by the output signal of a timing pulse generator 41, whereby the wave shown by (4) is derived from the integrator 38. The wave (4) is applied to the differentiator 39 and translated to the pulse train (5). Since the rectifying element 50 passes therethrough plus pulses, it generates the pulse train (6) which excites the bistable circuit 51. The bistable circuit 51 reverses its state every applied pulse, and therefore generates the wave (7). The wave (8) is the output signal of the bistable circuit 40. With respect to the case of FIG. 8(B), its detailed operation can be understood similarly with the case of FIGS. 4(B) and 6(B). When the differentiator 39 is replaced by a sampling circuit, the polarity of the rectifier 50 is reversed.

The following description relates to the case of a four-phase phase-modulated wave used for transmitting two telegraphic signals of two communication channels by a single carrier wave. In the case of a two-phase phase-modulated wave, the modulation is carried out so that the mark and space code elements are, respectively, in the same phase as and the reverse phase to the immediately preceding code element, but in the case of a four-phase phase-modulated wave. There are four combinations with respect to the mark and space of one channel A and of the other channel B of the two communication channels, as shown in FIGS. 9(A) and (B), in which A*ch* and B*ch* represent, respectively, channel A and channel B, and M*a*, M*b*, S*a* and S*b* represent the polarity of code elements, such as mark (M) or space (S), of the channels indicated by the respective suffix "*a*" or "*b*." The modulation is carried out in such a way that when the phase of each immediately preceding code element is taken as the reference standard, the phase difference of the instant code element and the immediately preceding code element becomes 0 in the combination of M*a* and M*b*, $\pi/2$ in the combination of M*a* and S*b*, $\pi/2$ in the combination of S*a* and M*a*, and $\pi$ in the combination of S*a* and S*b*. Examples of the modulation are shown in FIG. 9(*c*), in which the states of phase rotation of the phase-modulated wave, corresponding to the combination of the polarities of the channels A and B in the upper row, are shown in the lower row. In FIG. 9(*c*), the phase of the immediately preceding code element is shown by the dotted arrow line, and the phase of the present code element determined relative to the phase which is taken as a standard is shown by the full line. That is, the modulation is carried out in such a way the 0 phase which coincides with the phase of the immediately preceding code element, the phase of which is assumed to be 0 phase is obtained in the first combination of M*a* and M*b*, $\pi$ phase which is reverse to the immediately preceding code element is obtained in the second combination of S*a* and S*b*, $\pi/2$ phase lagging by $\pi/2$ from $\pi$ phase which is the second phase shown by a dotted line is obtained in the third combination of S*a* and M*b*, and so on.

Accordingly, in order to receive such a phase-modulated wave having four quantum phases described above, it is necessary only to control the phase of the reference standard carrier wave so that, when the phase of the combination of M*a* and M*b* is assumed to be the phase of the immediately preceding code element, the phase advances by $\pi/4$ in the communication channel A and lags by $\pi/4$ in the communication channel B, so as to obtain, respectively, the phases such as are shown by A*r* and B*r* in FIG. 9(B). According to a method such as that described above, since the demodulated output of a phase-modulated wave the demodulation being carried out in a ring modulator, is proportional to the cosine of the phase difference between the input signal wave and the reference standard carrier wave, the combinations of M*a*, M*b* and M*a*, S*b* produce, positive voltages and the combinations of S*a*, M*b* and S*a*, S*b* produce, negative voltages with respect to the reference carrier wave A*r*; and the combinations of M*a*, M*b* and S*a*, M*b* produce, positive voltages and the combinations of M*a*, S*b* and S*a*, S*b* produce, negative voltages with respect to the reference carrier wave B*r*, whereby correct demodulation is attained.

Figures 10, 11:
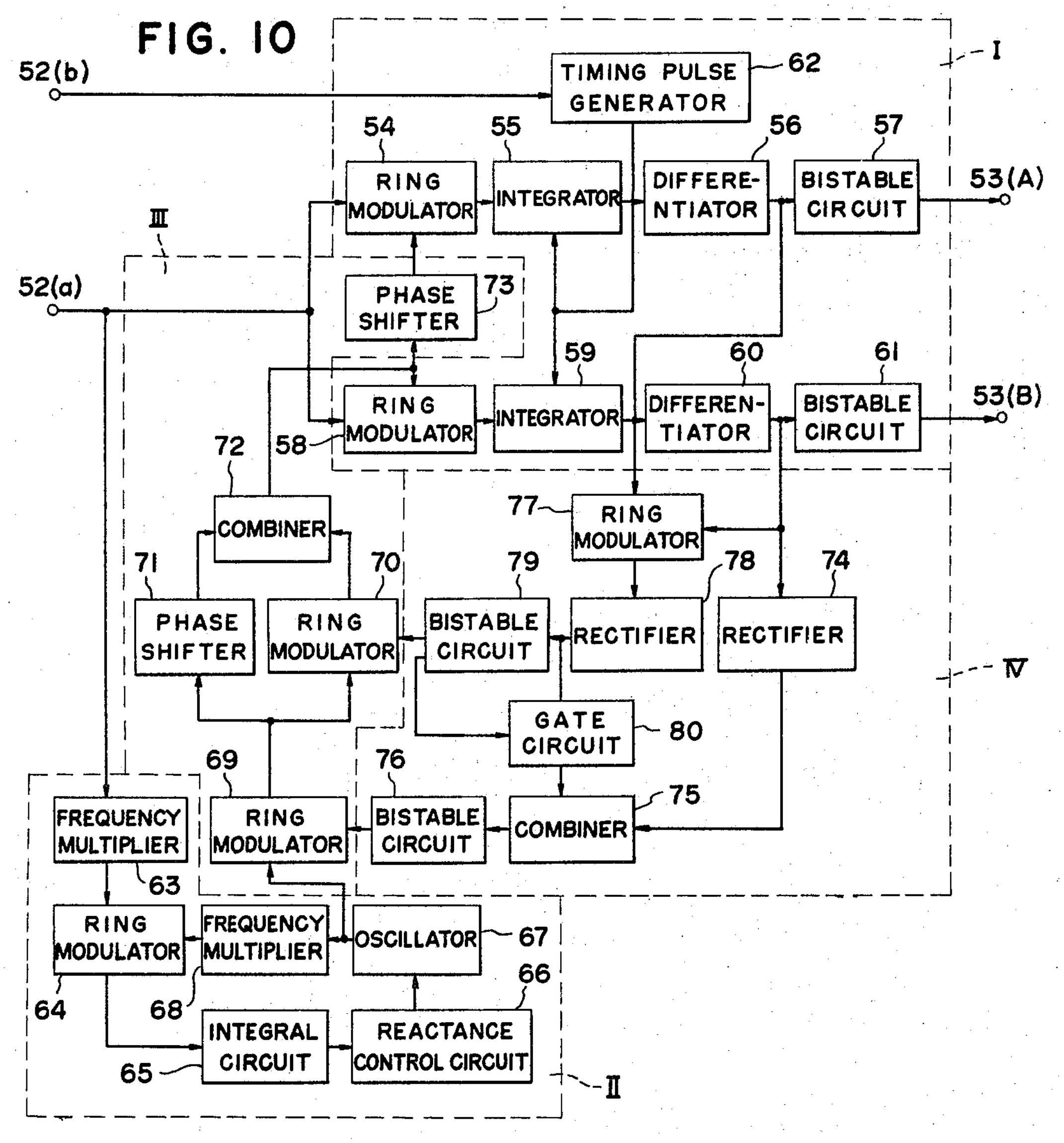
FIG. 10 is a block diagram of an embodiment of this invention, which is adapted to receive and demodulate phase-modulated telegraphic signals having four quantum phases shown in FIG. 9.
FIG. 11 is a diagram used to describe the operation of the embodiment shown in FIG. 10.

An example of the demodulation apparatus of this invention in which the above-mentioned demodulation is practically attained is shown in FIG. 10. In FIG. 10, a demodulation circuit I for the communication channels A and B, an automatic phase control circuit II, a regulation circuit III, and a phase memory circuit IV are the same means as those in FIGS. 2, 5 and 7. The details as to the operation of the automatic phase control circuit II are omitted herein because they are exactly the same as that of the examples of FIGS. 2, 5 and 7. The regulation circuit III produces a reference standard carrier wave A*r* for demodulation of the communication channel A and a reference standard carrier wave B*r* for demodulation of the communication channel B. A ring modulator 69 introduces the output of an oscillator 67, as it is or after conversion thereof into a reverse phase, into the next ring modulator 70 and a phase shifter 71. The phase shifter 71 operates to make the phase lag by $\pi/2$ and the ring modulator 70 passes its input signal therethrough as it is or in the state of reversed polarity. Accordingly, when the phase of the output of the ring modulator 70 and the phase of the output of the phase shifter 71 are superposed in a combiner 72, a signal having a phase lagging by $\pi/4$ or $3\pi/4$ relative to the phase of the output of the ring modulator 69 and also relative to the phase of the output signal of the oscillator 67 will be obtained from the output side of the said combiner 72. That is, the circuit composed of the ring modulator 70, the phase shifter 71 and the combiner 72 carries out a phase-shift of $\pi/2$ or $-\pi/2$ relative to the immediately preceding phase thereof by reversing the phase of a bistable circuit 79. The output B*r* of the combiner 72 is used as a reference standard carrier wave B*r* for demodulation of the communication channel B. The reference standard carrier wave A*r* for demodulation of the communication channel A can be obtained by shifting the above-mentioned carrier wave B*r* by $\pi/2$ by means of a phase shifter 73.

The manner in which telegraphic codes of the communication channels A and B are demodulated, in the demodulation circuit I comprising a ring modulator 54 (or 58), an integrator 55 (or 59), a differentiator 56 (or 60), a bistable circuit 57 (or 61) and a timing pulse generator 62, is the same as that in the case of FIG. 2.

The operation of the phase memory circuit IV will now be described below. The polarities of the demodulated output pulses of the differentiators 56 and 60 in the communication channels A and B are shown in FIG. 11. The product of the said output pulses obtained in a ring modulator 77 is also shown in FIG. 11. Rectifiers 74 and 78 are set so that the former passes only (+) pulses therethrough and the latter passes only (−) pulses therethrough. The following description relates to the case in which the output pulses A and B of the differentiators in FIG. 11 and the product A×B thereof are taken into consideration. In the embodiment of FIG. 10 also, the control of the ring modulators 69, 70 and of the gate circuit 80 by the bistable circuits 76 and 79 is carried out with a slight time lag as shown by (7) in FIGS. 6(A) and 6(B). The details of operation are as follows:

(1) In the combination of M*a*, M*b*:

Since the output pulses A and B are of (−) polarity, the product $A \times B$ assumes (+) polarity, so that no pulses can pass through the rectifiers 74 and 78. Accordingly, the states of the bistable circuits 76 and 79 cannot be reversed, and the output of the oscillator 67 is applied as the reference carrier wave B*r* to the ring modulator 58 or the ring modulator 54 through the phase shifter 73 in the state of the same phase. Accordingly, the carrier waves Ar and Br maintain their previous phases as they are.

(2) In the combination of Sa, Sb:

In this case, since the outputs A and B are of (+) polarity, their product $A \times B$ assumes (+) polarity and the pulse B passes through the rectifier 74 and the product $A \times B$ does not pass through the rectifier 78. The pulse having passed the rectifier 74 is introduced, through a combiner 75, into the bistable circuit 76 so as to reverse the state of the circuit 76. Accordingly, the phases of the carrier waves Ar and Br are shifted by $\pi$ in the ring modulator 69.

(3) In the combination of Sa, Mb:

In this case, since the output pulses A and B are, respectively, of (+) polarity and (−) polarity, their product $A \times B$ assumes (−) polarity. The (−) pulse of the product $A \times B$ passes through the rectifier 78 and reverses the state of the bistable circuit 79, whereby the phase of the carrier waves Ar and Br are shifted by $\pi/2$. Furthermore, if the code element having the same combination of Sa and Mb are introduced, just as the succeeding code element, the (−) pulse, passes through the gate circuit 80, because the bistable circuit 79 has been previously reversed, and is then introduced into the bistable circuit 76 through the combiner 75 so as to reverse the state of the circuit 76, whereby the phases are shifted by $\pi$ by the ring modulator 69. At the same time as the phase shift, the above-mentioned pulse restores the bistable circuit 79, so that the phase is advanced by $\pi/2$ by means of the ring modulator 70. In accordance with the above-mentioned two combination operations, the phases of the carrier waves Ar and Br are shifted by $-\pi/2$. When the code element representative of the same combination of Sa and Mb has been introduced as the next succeeding code element, the (−) pulse does not pass through the gate circuit 80, so that the initial operation is carried out.

(4) In the combination of Ma, Sb:

In this case, since the output pulses A and B are, respectively, of (−) polarity and (+) polarity, their product $A \times B$ assumes (−) polarity. Accordingly, both output pulses pass through the rectifiers 74 and 78, whereby the output pulses reverse the states of bistable circuits 76 and 79 and then the output signal of oscillator 67 is made to lag by $\pi$ at the ring modulator 69 and further by $\pi/2$ at the ring modulator 70. Accordingly, the phases of the carrier waves Ar and Br are equivalently advanced by $\pi/2$. Furthermore, when the code element having the combination of Ma and Sb are afterwards introduced in the apparatus, the (−) pulse passes through the gate circuit 80 and cancels the (+) pulse applied to the combiner 75, so that the phase shift of $\pi$ is not carried out, and the phase is advanced by $\pi/2$ due to restoration of the bistable circuit 79. Furthermore, when the code element having the instant combination Ma and Sb is introduced into the apparatus, the above-mentioned operations are alternately repeated.

The initial phase of the reference standard carrier wave Sf can assume two kinds of states in the case of demodulation of a two-phase phase-modulated wave shown in FIG. 2, while in the case of demodulation of four-phase phase-modulated wave, the phases of such reference standard carrier waves Ar and Br shown in FIG. 10 can assume four kinds of states. However, the number of code elements detected as error is only one, in the worst case, similarly as in the case of FIG. 2.

When the differentiators 56 and 60 are replaced, respectively, by sampling circuits, the polarity of the rectifying element 74 is reversed.

Figure 12:
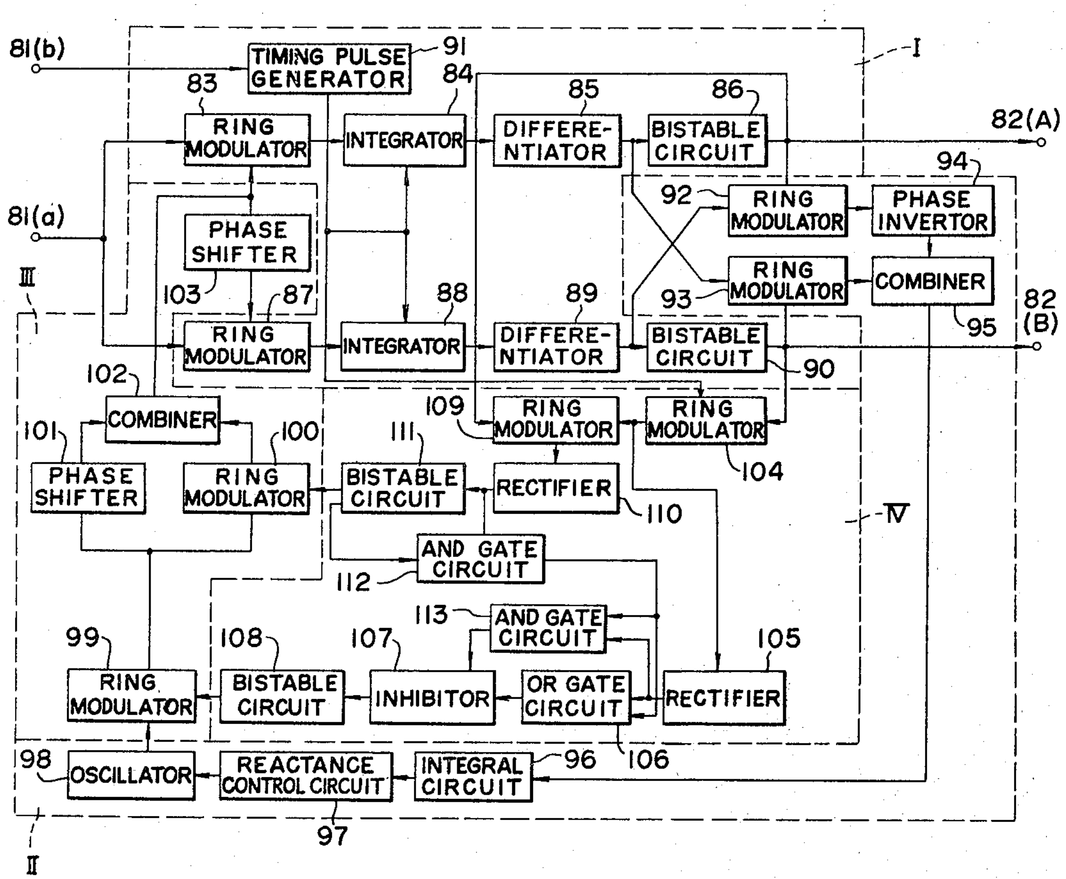
FIG. 12 is a block diagram of another embodiment of this invention, which is adapted to the phase-modulated signal shown in FIG. 9.

Another example of this invention in which a four-phase phase-modulated telegraphic wave for transmitting two communication channels is to be demodulated is shown in FIG. 12. In this example, the demodulation circuit I, the regulation circuit III, and the phase memory circuit IV are substantially equal to those of the example of FIG. 10. This embodiment of FIG. 12 shows that the phase memory circuit IV can attain its function sufficiently by the use of the circuit system of FIG. 12. The operation of the phase memory circuit IV can be easily understood from that of the example of FIG. 10.

The embodiment of FIG. 12 differs from that of FIG. 10 only in the automatic phase control circuit II. The phase control operation in this circuit is carried out by utilizing demodulated components of the communication channels A and B as is shown by the broken line zone.

Figure 13:
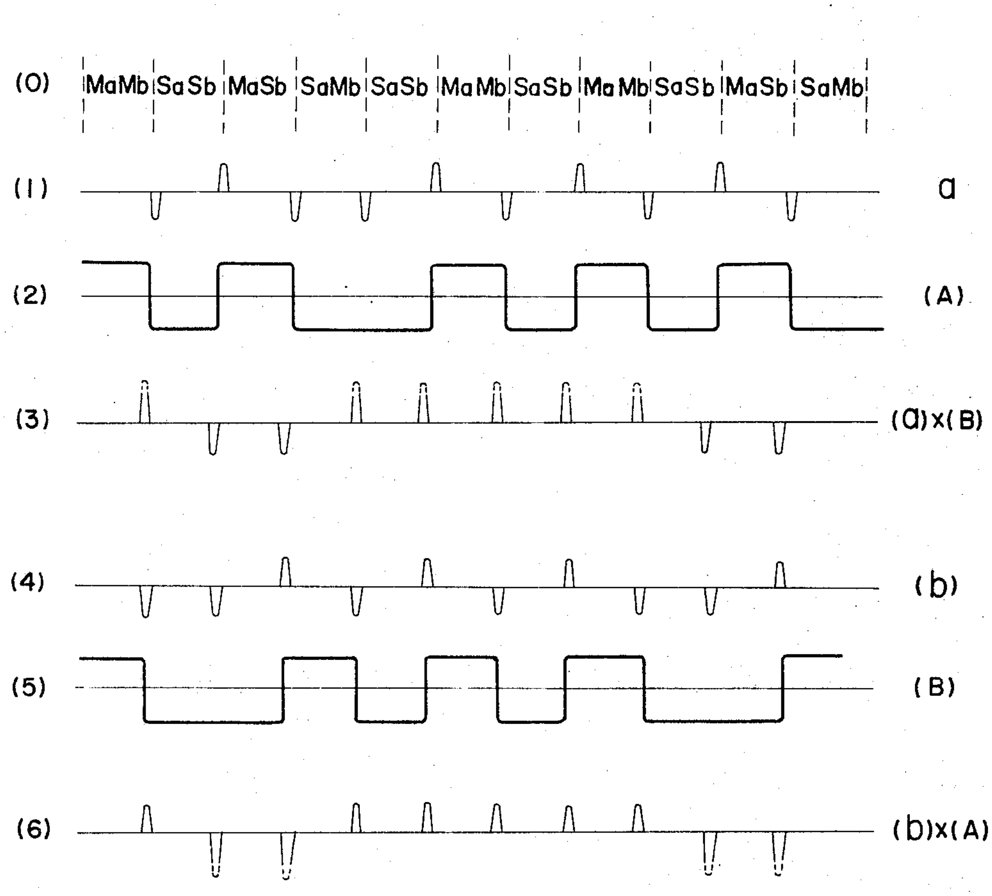
FIG. 13 shows waves used to describe the operation of the automatic phase control circuit of the device shown in FIG. 12.

This operation will now be described in connection with FIG. 13, in which polarity combinations of both communication channels A and B, the differentiated pulse (a) of the channel A, the output (A) of the bistable circuit 86 in the channel A, the differentiated pulse (b) of the channel B, and the output (B) of the bistable circuit 90 of the channel B are, respectively, represented by (0), (1), (2), (4) and (5). Furthermore, the pulse train produced by the product of $(a) \times (b)$ and the pulse train produced by the product of $(b) \times (A)$ are, respectively, represented by (3) and (6). For example, at the transition instant from the first code element Ma, Mb to the second code element Sa Sb, the pulse (a) becomes (−) pulse, whereby the state of bistable circuit 89 is reversed so as to be (−) polarity. Accordingly, in the pulse train (3), the pulse assumes (+) polarity and so on. When the above-mentioned pulse train is produced, a voltage corresponding to a phase shift of the reference standard carrier waves Ar and Br for demodulation can be obtained by superposing the pulse trains (3) and (6), after reversing the polarity of one of said pulse trains (3) and (6). In other words, a voltage corresponding to the phase shift of the reference carrier waves Ar and Br can be obtained by subtracting the demodulated pulse amplitude component caused by a reference carrier wave Br lagging by $\pi/4$ relative to the phase of the immediately preceding code element from the demodulated pulse amplitude component caused by the reference carrier wave Ar which advances by $\pi/4$ relative to the phase of the code element. For example, when, the phases of the carrier waves are shifted as shown by Ar- and Br- in FIG. 9(B), the pulse trains (3) and (6) in FIG. 13 produce a difference of amplitudes at the (−) side and (+) side shown by the dotted pulse form of the same FIG., so that the phase shift of the carrier waves Ar and Br can be corrected by using the above-mentioned difference of amplitude. In FIG. 12, the ring modulators 92 and 93 produce, respectively, the pulse trains (6) and (3). Accordingly, when, as is shown in FIG. 12, the output pulse train (6) of the ring modulator 92 is reversed in its polarity by using the phase inverter 94 and then superposed the output pulse train (3) of the ring modulator 93 at the combiner 95, a voltage corresponding to the phase shift of the carrier waves Ar and Br can be obtained. This voltage can be utilized after its integration by an integrator 96 to control the phase shifting of the oscillator 98 through a reactance circuit 97.

When the differentiators 85 and 89 are replaced, respectively, by sampling circuit, the polarity of rectifier 105 is reversed.

An embodiment of this invention, which is schematically illustrated in FIG. 14 (substantially equivalent to FIG. 3(B)) and which can demodulate a phase-modulated wave having said four-quantum phases, will be described below. The demodulation circuit I and the automatic control circuit II are the same as those shown in FIG. 10. In this embodiment, the phase detector operations of channels A and B are carried out by the use of carrier waves Ar and Br which are produced in the circuit II and have, respectively, constant phase positions which differ by $\pi/2$ from each other, the carrier waves Ar and Br being the same as shown in FIG. 9(B). However, operations of the regulation circuit III and the phase memory circuit IV thereof differ from the case of FIG. 10; the construction and operation of these circuits are described referring to FIGS. 15(A), (B), (C) and (D). In the demodulation circuit for channel A composed of the ring modulator 116, the integrator 117 and the differentiator 118, and in the demodulation circuit for channel B composed of the ring modulator 120, the integrator 121 and the differentiator 122, the input phase-modulated signal is detected and converted into two pulse trains, respectively, corresponding to channels A and B. The pulse train of channel A passes through a gate circuit 133 or 134, and the pulse train of channel B passes through a gate circuit 135 or 136. In this case, through which gate said pulse trains pass is determined by the state of the bistable circuit 161. The outputs of the gate circuits 133 and 135 are applied to a ring modulator 137, and the outputs of the gate circuits 134 and 135 are applied to a ring modulator 138. Accordingly, the outputs of differentiators 118 and 122 are applied to the ring modulator 137 or 138 in compliance with the state of the bistable circuit 161. The ring modulators 137 and 138 are controlled, respectively, by the outputs of the bistable circuits 159 and 158. Outputs of the ring modulators 137 and 138 are applied, respectively, to bistable circuits 119 and 123 which are caused to reverse the states thereof by every introduced pulse of different polarity. Other bistable circuits 158, 159 and 161 are caused to reverse the states thereof every applied pulse. The output of the ring modulator 137 is passed through a rectifying element 139 for passing positive pulses or a rectifying element 141 for passing negative pulses and a phase inverter 142. The output of the ring modulator 138 passes through a rectifying element 140 for passing positive pulses or a rectifying element 143 for passing negative pulses and a phase invertor 144. These pulses are passed through, as shown in FIG. 14, AND circuits 145, 146, 147, 148, 149, 150, 151, 152, and 153 and OR circuits 154, 155, 156, 157 and 160, and then excite the bistable circuits 158, 159 and 161. The AND circuits and the OR circuits operate by positive pulse or normal output voltage (of bistable circuit). (When the differentiators 118 and 122 are replaced, respectively, by sampling circuits, polarities of said rectifiers 139, 140, 141 and 143 are reversed and said invertors 142 and 144 are, respectively, inserted in the outputs of the rectifiers 139 and 140.)

Details of this embodiment are disclosed as follows referring to FIG. 15 (A), (B), (C) and (D). Now, it is assumed first that the gate circuits 133 and 135 are opened and the ring modulator 137 and 138 pass their input pulses as they are, therefore both of the bistable circuits 158 and 159 are in normal states in which the output $\beta>$ the output $\alpha$ and the output $\alpha>$ the output $\delta$ with respect to their voltages; in addition, when the states of bistable circuits 158 and 159 are reversed, the output $\gamma>$ the output $\beta$ and the output $\delta>$ the output $\gamma$ with respect to their voltages. On the other hand, the polarities of the output pulses of differentiators are of negative or positive polarity in accordance with, respectively, the positive or negative polarity of output pulses of the ring modulators 116 and 120. In all of the FIGS. 15(A), (B), (C) and (D), lines (1), (2) and (4) show the polarity of the output pulses, respectively, with respect to the differentiators 118 and 122, the gate circuits 133, 134, 135 and 136, and the ring modulators 137 and 138; line (3) shows the reverse of the pulse polarity in the ring modulators 137 and 138; columns (1), (2), (3) and (4) show, respectively, transition of every pulse polarity in the case in which code elements MM, MS, SS and SM shown in the corresponding boxes of line (5) are received; A*ch* and B*ch* show that corresponding columns belong, respectively, to A channel and B channel; crossed-dotted arrows show exchanges of pulses by the gate circuits; and straight passed dotted arrows means that pulse signals in the respective column are passed without the reverse of their polarities. Operations of the circuit III and the circuit IV is disclosed as follows on the basis of the above mentioned descriptions.

Figure 15A:
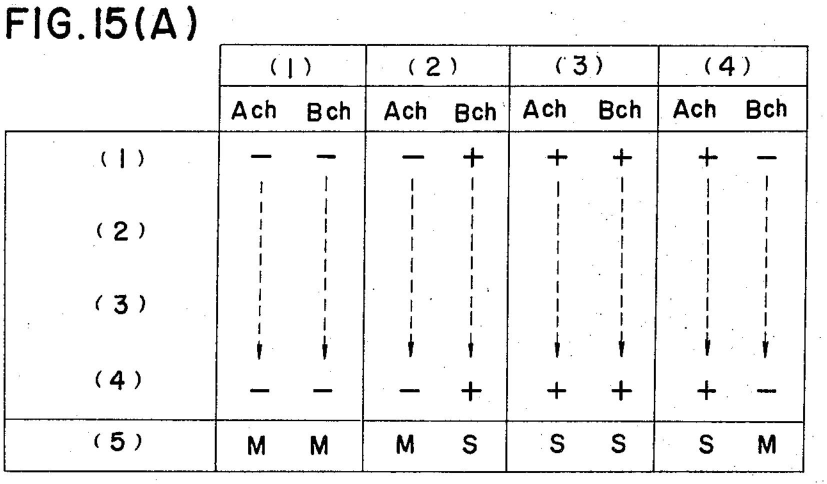

(1) The case in which a code element MM is received:

In this case, the output pulses of ring modulators 137 and 138 are, respectively, of polarities (−) and (−). (According to the following description in (1), (2), (3) and (4), it is successively understood that this condition of polarities (−) and (−) is obtained irrespective of the phase of immediately preceding code element.) The pulses of polarities (−) and (−) are passed through the rectifying elements 141 and 143, respectively, but any one of AND circuits 146 to 153 does not pass the pulses; therefore the bistable circuits 158, 159 and 161 keeps the states thereof as they are. Accordingly, when the next code element is introduced into these circuits, it is correctly demodulated with respect to any just succeeding code element as is shown in FIG. 15(A).

Figure 15B:
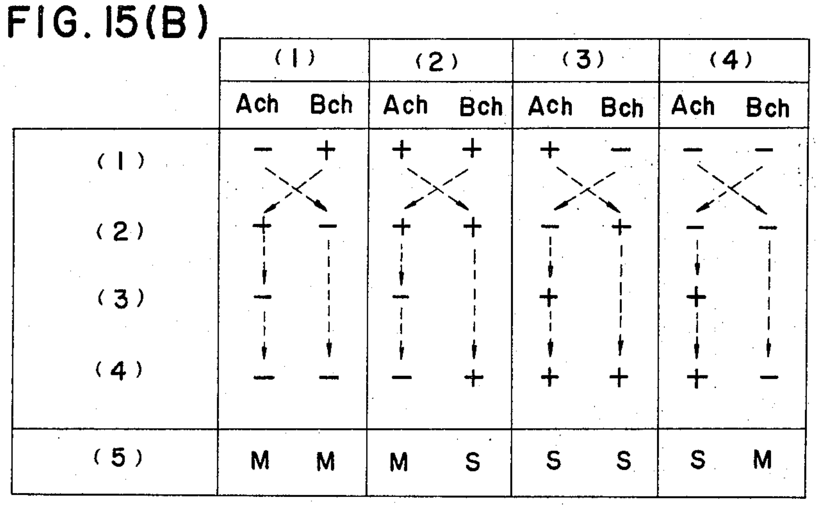
Figure 15C:
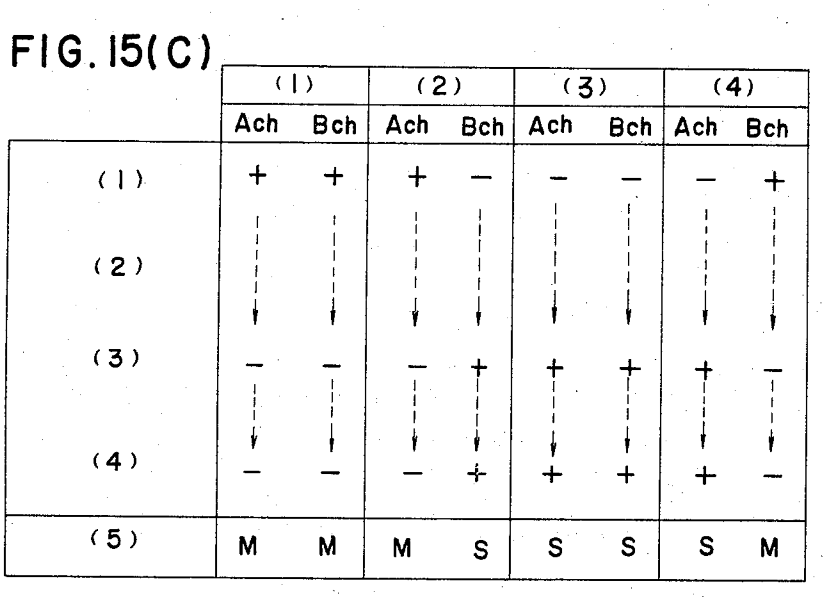
Figure 15D:
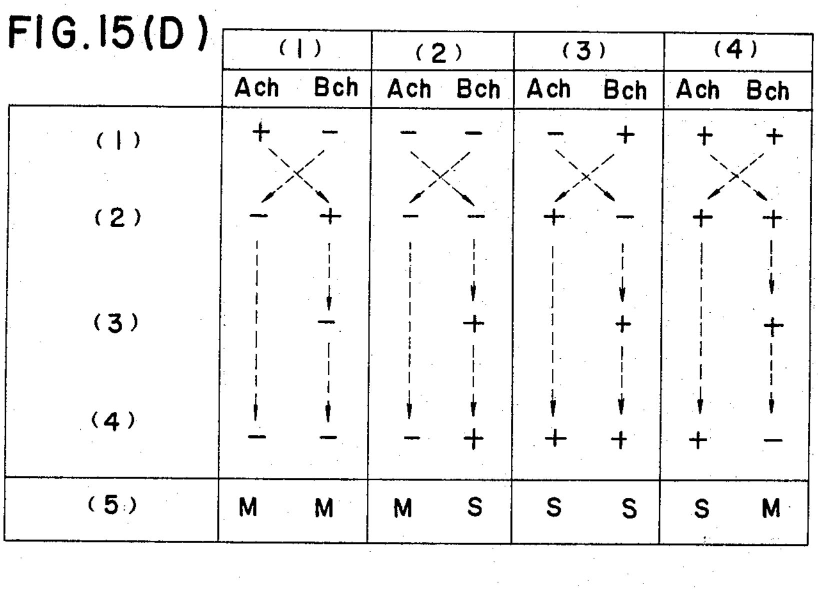

(2) The case in which a code element MS is received:

In this case, the output pulses of ring modulators 137 and 138 are respectively, of polarities (−) and (+). These pulses pass respectively the rectifying elements 141 and 140. Since the outputs $\beta$ and $\gamma$ are in the normal states in this case, only the AND circuit 153 generates the output pulse thereof, which passes through the OR circuits 155 and 160 and reverses the state of the bistable circuit 161 and moreover passes through the OR circuits 155 and 157 and reverses the state of the bistable circuit 159. Accordingly, the output pulse of the differentiator 118 is applied to the ring modulator 138 through the gate circuit 134, and the output pulse of the differentiator 122 is applied to the ring modulator 137 through the gate circuit 136, and then only the pulse of channel A is reversed as to its polarity in the ring modulator 137 controlled by the output of the bistable circuit 159. The demodulation operation of the just succeeding code element in this case is illustrated in FIG. 15(B), in which all cases of phases of code elements are correctly demodulated. When the code element MS is received again, the ring modulators 137 and 138 generate, respectively, (−) and (−) pulses as described above. However, since the output $\delta$ is in the normal state in this case, the AND circuit 150 generates the output pulse thereof. This pulse passes through the OR circuit 160 and restores the state of bistable circuit 161, and passes through the OR circuit 156 and reverses the state of the bistable circuit 158. Accordingly, the output pulse of the differentiator 118 passes through the gate circuit 133 and the polarity thereof is reversed in the ring modulator 137, and the output pulse of the differentiator 122 passes through the gate circuit 135 and the polarity thereof is reversed in the ring modulator 138. Demodulation operation in this case is shown in FIG. 15(C). Then when the code element MS is further received, the AND circuit 149 generates the output pulse thereof which reverses the state of bistable circuit 161 and restores the state of bistable circuit 159. Demodulation operation in this case is shown in FIG. 15(D). When the code element MS is next received, the AND circuit 146 generates the output pulse thereof, which restores both the bistable circuits 158 and 161. Therefore, the demodulation operation in this case corresponds to the case of FIG. 15(A).

(3) The case in which a code element SS is received:

In this case, the output pulses of ring modulators 137 and 138 are, respectively, of polarities (−) and (+). These pulses pass, respectively through the rectifying elements 139 and 140, and pass through the AND circuit 145. The output pulse of the AND circuit 145 passes through the OR circuits 156 and 157, and output pulses of the OR circuits 156 and 157 reverse, respectively, the states of the bistable circuits 158 and 159. Accordingly, the demodulation operation in this case corresponds to the case as shown in FIG. 15(C).

When the code element SS is received again, the OR circuits 156 and 157 generate, respectively, the output pulses thereof which restore the states of the bistable circuits 158 and 159. The demodulation operation of this case corresponds to the case as shown in FIG. 15(A).

(4) The case wherein a code element SM is received:

In this case, the output pulses of ring modulators 137 and 138 are, respectively, of polarities (+) and (−). These pulses pass, respectively, through the rectifying elements 139 and 143, and the AND circuit 152. The output pulse of this circuit 152 passes through the OR circuits 154, 156 and 160, and the output pulses of the OR circuits 156 and 160 reverse the states of the bistable circuits 158 and 161. The demodulation operation in this case corresponds to the case shown in FIG. 15(D).

When the code element SM is received again, since the output $\gamma$ in the normal state, the AND circuit 151 generates the output pulse thereof, which passes through OR circuit 157 and 160 and restores the bistable circuit 161 and further reverses the bistable circuit 159. The demodulation operation in this case corresponds to the case shown in FIG. 15(C).

Then when the code element MS is further received, since the outputs $\gamma$ and $\delta$ are in the normal states, the AND circuit 148 generates the output pulses thereof, which pass through the OR circuits 154, 156 and 160 and reverse the bistable circuit 161 and further restore the bistable circuit 158. The demodulation operation in this case corresponds to the case as shown in FIG. 15(B).

When the code element SM is moreover received again, since the outputs $\beta$ and $\delta$ are in the normal states, the AND circuit 147 generates the output pulse thereof, which passes through the OR circuits 155, 157 and 160 and restores the bistable circuits 159 and 161. The demodulation operation in this case corresponds to the case shown in FIG. 15(A). According to the above mentioned details, any code element can be demodulated correctly irrespective of the phase of the immediately preceding code element.

In the following description, another embodiment of this invention is disclosed, referring to the FIGS. 16 and 17, which is substantially equivalent to FIG. 3(C). In this embodiment, the demodulation circuit I and the automatic control circuit II are substantially equivalent to those shown in FIGS. 10 and 14. The circuit I is composed of ring modulators 164 and 168, integrators 165 and 169 controlled by a timing pulse generator 172, differentiators 166 and 170 and bistable circuits 167 and 171. The automatic control circuit II is composed of frequency multipliers 173 and 178, a ring modulator 174, an integrator 175, an oscillator 177 controlled by a reactance control circuit 176 and phase shifters 178 and 180. Accordingly, details of these circuits are omitted. The regulation circuit III composed of ring modulators 181 and 182, a phase shifter 182 and a combiner 183 is substantially equivalent to that shown in FIG. 10. However, the object to be controlled by this circuit III is the input phase modulated signal differing from that shown in FIG. 10, which has been provided for controlling the output signal of the circuit II. Operations of this circuit III and the phase memory circuit IV are described in detail hereafter.

The phase memory circuit IV is composed of a rectifier element 188 for passing through negative pulses, rectifying element 186 for passing through positive pulses, a ring modulator 185, a phase inverter 187, AND circuits 190 and 191, an OR circuit 192, an inhibitor 193, and bistable circuits 189 and 194. FIG. 17 is provided to explain the operation of this circuit IV. In this FIG. 17 column (1) shows polarities of code elements in the input signal; column (2) shows quantum phases corresponding to the respective polarities in column (1); column (3) shows the polarities of the output pulses of the differentiator 166; column (4) shows the polarities of the output pulses of the differentiator 167; column (5) shows polarities of the output pulses of the ring modulator 185; column (6) shows polarities of the output pulses of the phase inverter 187; and column (7) shows polarities of the output pulses of the rectifying element 188. Each line corresponds to a respective code element in column (1). The input signal of this embodiment is the same as shown in FIGS. 9(A) and 9(B). The demodulation operation in this embodiment is carried out as follows:

(1) The input signal is transformed to a phase-modulated wave having fixed-quantum phases (shown in FIGS. 9(A) and 9(B)) irrespective of the phase of the immediately preceding code element;

(2) The transformed phase modulated wave having fixed-quantum phases is demodulated correctly by the use of a carrier wave having a constant phase. The operation (1) is carried out in the circuit III controlled by the circuit IV, and the operation (2) is carried out in the circuit I by the use of the carrier wave produced in the circuit II. With reference to the summarized description mentioned above and FIG. 17, it can be understood that phase rotation in the circuit III is to be carried out as follows. That is, when the rectifying element 188 generates a (−) pulse in its output; the circuit III shifts by ($\pm\pi/2$) the phase of the input phase modulated signal; and when the phase inverter 187 generates a (−) pulse in its output, the circuit III shifts, by ($\pi$), the phase of the input phase-modulated signal.

(1) The case in which a code element MM is received:

In this case, neither the rectifying element 188 nor the phase inverter 187 generate output pulses thereof. Accordingly, states of bistable circuits 189 and 194 are held as they are.

(2) The case in which a code element SM is received:

In this case, only the rectifying element 188 generates the output pulse thereof, which reverses the state of the bistable circuit 189. Accordingly, the phase of the input signal is shifted, by ($-\pi/2$), in a phase shifting circuit composed of the ring modulator 181, the phase shifter 182 and the combiner 183. When the code element SM is received again, similar operations are repeated.

(3) The case in which a code element SS is received:

In this case, only the phase inverter 187 generates the output pulse thereof, which passes through the OR circuit 192. However, since the rectifying element 188 does not generate the output pulse thereof, neither the AND circuit 190 nor 191 generates the output pulse thereof. Accordingly, the output pulse of the OR circuit 192 passes the inhibitor 193 without obstruction by a pulse from the AND circuit 191. Then the state of the bistable circuit 194 is reversed, therefore, the phase of the input signal is shifted, by ($\pi$), in the ring modulator 184. When the code element SS is received again, similar operations are repeated.

(4) The case in which a code element MS is received:

In this case, both the rectifying element 188 and the phase inverter 187 generate output pulses. The output pulse of the rectifying element 188 reverses the state of the bistable circuit 189; and the output pulse of the phase inverter 187 passes through the OR circuit 192. On the other hand, the AND circuit 190 has not two input signals at the instant when the output pulse of the rectifying element 188 is applied, therefore neither of the AND circuits 190 or 191 generates the output pulses thereof. Accordingly, the output pulse of the OR circuit 192 passes through the inhibiter 193 and reverses the state of the bistable circuit 194, whereby the phase of the input signal is shifted by ($-\pi/2$) in the phase shifting circuit (composed of the ring modulator 181, the phase shifter 182 and the combiner 183) and further shifted by ($\pi$) in the ring modulator 184.

When the same code element MS is received, the circuits 188 and 187 generate their output pulses. In this case, since the state of the bistable circuit 189 is restored, the AND circuit 190 has two inputs at the instant when the output pulse is applied to this AND circuit 190, whereby the AND circuit 190 generates the output pulse thereof. Accordingly, the AND circuit 191 generates its output pulse. On the other hand, the output pulse of the phase inverter 187 passes through the OR circuit 192, but is inhibited by the output pulse of the AND circuit 191 in the inhibiter 193. The state of the bistable circuit 194 is not reversed in this case, therefore the ring modulator 184 rotates, by $\pi$, the phase of the input signal thereof. However, restoration of the state of the bistable circuit 189 does not rotate the phase of the input signal thereof.

When the same code element MS is received, similar operations as mentioned-above are repeated alternately.

According to said operation, the regulation circuit III generates the phase modulated signal which has fixed-quantum phases as are shown in FIGS. 9(A) and 9(B). In the circuit I the phase modulation signal is correctly demodulated by the use of carrier waves A*r* and B*r* obtainable in the circuit II. In this embodiment, when differentiators 166 and 170 are replaced, respectively, by sampling circuits, the polarity of the rectifying element 186 is reversed and the inverter 187 is removed; that is, the output signal is directly applied to the circuits 191 and 192.

An example of this invention in which an eight-phase phase-modulated telegraphic wave having eight quantum phases to be employed for forming three communication channels by means of a single carrier wave will be described below. In FIGS. 18(A) and (B) there is shown the relation among the combinations of polarities of the code elements in the case of eight quantum phases and the phase shift angles corresponding to these combinations. Besides the above-mentioned quantum phases, many other quantum methods can be considered, but the former quantum method will be illustratively described below.

In order to demodulate the above-mentioned phase modulation wave, it is sufficient to use four-reference standard carrier waves, such as are shown by R*a*, R*b*, R*c*, R*d* in FIG. 19(A). The communication channels A and B can be directly demodulated by using, respectively, the carrier waves R*a* and R*b*, but the communication channel C can be demodulated by use of the product of the detected outputs caused by the carrier waves R*c* and R*d*.

The actual embodiment of this invention which carries out the above-mentioned demodulation is shown in FIG. 20, which substantially corresponds to FIG. 3(A). This embodiment corresponds to the case in which the example of FIG. 10 has been modified so as to apply to demodulation of a wave modulated into eight-quantum phases. The operations of the demodulation circuit I is as follows. The communication channels A and B can be directly demodulated by utilizing carrier waves R*a* and R*b* as are shown in FIG. 20, but this communication channel C is first detected with respect to its phase by the carrier waves R*c* and R*d* and then correctly demodulated by the use of a product of the detected components by the carrier waves R*c* and R*d*, said product being derived through the ring modulator 211. The regulation circuit III includes further a phase shifter of $\pi/4$, besides the two phase shifters of $\pi$ and $\pi/2$ shown in FIG. 8. The reference standard carrier waves R*a*, R*b*, R*c*, and R*d* can be produced by controlling the above-mentioned three phase shifters, by bistable circuits 235, 240 and 243, respectively. This production process can be easily seen from the example of FIG. 10. Since there is a difference between amplitudes of detected pulse signals in each of the demodulators in the case of over eight-quantum phases, a sampling system for obtaining a pulse signal of constant amplitude is employed as is shown in FIG. 20 (and 21).

In FIG. 21 there is shown another embodiment of this invention, wherein the demodulation circuit I, the regulation circuit III, and the phase memory circuit IV are the same as those of the example of FIG. 20. Only the automatic phase control circuit II differs somewhat from that of the example of FIG. 20 and is substantially similar to that of FIG. 12.

In the example of FIG. 12, the phase controlling voltage has been obtained by subtracting the demodulated component caused by the reference carrier wave B*r* (having a lagging phase from the reference phase) from the demodulated component caused by the reference carrier wave A*r* (having an advanced or leading phase from the reference 0 phase). However, in the example of FIG. 21, the phase controlling voltage is obtained, assuming that the phase of the immediately preceding code element is 0 phase and the phase of the instant code element is also 0 phase, by subtracting a demodulated amplitude component caused by the carrier wave R*a* (having a phase lag of 67.5°) from the demodulated amplitude component caused by the carrier wave R*d*. The above-mentioned voltage can be obtained by subtracting the demodulated amplitude component produced by the carrier wave R*c* from the demodulated amplitude component produced by the carrier wave R*b*. However, since the above-mentioned voltage necessary for phase control is substantially proportional to the deviation of the phase of the input signal from the reference carrier waves it is larger in the former case than in the later case. Accordingly, the former case is preferably adopted because of its high efficiency for phase-control. All of the components to be taken out in connection with all kinds of phases of the code elements are shown in FIG. 19(B), in which the demodulated component produced by the reference carrier waves R*a*, R*b*, R*c*, and R*d* are, respectively, shown by references (*a*), (*b*), (*c*) and (*d*), and the polarities of which are shown by (+) and (—) and in which is shown for example the fact that when the phase of the immediately preceding code element is 0 phase, a component (*d*—*a*) is to be taken out. Furthermore, their products (*ab*), (*cd*) and (*abcd*) are shown in FIG. 19(B). It will be apparent that, by comparing the desirable components to be taken out with the polarities (+) and (—) of the demodulated components, the desirable components can be obtained as follows:

(1) (*d*) or (*c*) is picked up in accordance with the polarity (+) or (—) of the product (*ab*).

(2) (*a*) or (*b*) is picked up in accordance with the polarity (+) or (—) of the product (*cd*).

(3) (—*a*) or (*a*) is picked up in accordance with the polarity of the product (*abcd*).

(4) The polarity of the component obtained in accordance with operations (1), (2), or (3) mentioned-above is taken out as it is when (*a*) is of (+) polarity and is taken out in the reversed state when (*a*) is of (—) polarity.

In the automatic phase control circuit II of FIG. 21, the above-mentioned operations are carried out, and the operations (1), (2), (3) and (4) are, respectively, carried out in gate circuits 273 and 272, in gate circuits 270 and 271, in the combined circuit consisting of an inverter 265, a ring modulator 269, and a gate circuit 270, and in ring modulators 274 and 275. The output of the combiner 276 is integrated by an integrator 277 and controls, through a reactance control circuit 278, the phase of the output of the oscillator 279, whereby the phase of the reference carrier waves R*a*, R*b*, R*c* and R*d* are surely maintained in their correct phases.

When differentiators of the demodulation circuit I in the case of eight-quantum phases are replaced, respectively, by sampling circuits, next-connected bistable circuits are arranged so as to generate correct outputs in the reverse pulse polarity of those mentioned-above.

The above-mentioned examples relate to the demodulation of the phase-modulated wave having two, four or eight quantum phase but this invention can be further applied to demodulation of a phase-modulated wave having $2n$ number of quantum phases which are used to form $n$ number of communication channels by a signal carrier wave.

It is to be clearly understood that another embodiment for phase-modulated waves of eight-quantum phases which are substantially equivalent to those as shown in FIGS. 3(B) and 3(C) can be constructed as well as the embodiment shown in FIGS. 20 and 21. These embodiments can be obtained by applying the embodiment of FIGS. 14 and 16 to the demodulation of phase-modulated waves having eight-quantum phases on the analogy of the embodiment in FIGS. 20 and 21.

In the above-mentioned description, the input phase-modulated waves comprise only one carrier wave. However, demodulation apparatus according to this invention can be applied to demodulate a plurality of phase-modulated waves arranged in the frequency allocation of $(1/T)$ cycles/second as well as the Kineplex System; where T is the integrating duration of the integrator of the demodulation circuit I controlled by the timing pulse which is supplied from the timing pulse generator. That is, when the input carrier waves are arranged in one of the frequencies $(f_0 \pm n/T)$ cycles/second (where $f_0$ is substantially the center frequency in the frequency band of transmission line; and $n$ is a positive integer), and a plurality of demodulation apparatus equal to the number of the input carrier waves are provided, beat frequencies $(n/T)$ are generated at the output side of every ring modulator of circuit I. Accordingly, beat frequencies produced in any one of the demodulation apparatus are respectively equal to frequencies $(1/T, 2/T, 3/T \ldots$ and $n/T)$ cycles/second with respect to the first adjacent carrier waves, the second adjacent carrier waves, the third adjacent carrier waves, etc. However, since the integrating duration of the demodulation circuit I is set into a period T, the integrated outputs of the integrator are equal to zero value with respect to undesirable carrier waves, such as the first, second, third . . . adjacent carrier waves, thereby making obtainable an integrated output with respect to only the present carrier waves can be derived from the respective integrator.

As mentioned-above, the possibility of obtaining a number of communication channels in a defined frequency band is one of the most valuable features of this invention; that is, it is not difficult to form 120 channels of 50 Bauds telegraphic link in a 3 kilo-cycle band.

A system for producing the timing pulse to be employed in any of all embodiments mentioned above will now be disclosed. In a simple system, a particular channel for transmitting the timing pulse signal is provided in a different frequency band or apart slightly from the main band so as to be derived from the main band by means of dividing means, such as a filter. In this case, any of the modulation methods, such as amplitude or frequency modulation, can be adopted to transmit the timing pulse signal. This system, however, has the disadvantage of the necessity to provide a different channel or frequency band for transmitting the timing pulse signal. In order to eliminate this disadvantage, it is desirable to employ one of the carrier waves arranged in the frequency allocation of the $(1/T)$ cycles/second as the channel for transmitting a timing pulse generator. One example of such a system which is to be applied to detect information of the timing pulse from one of the arranged carrier waves and to produce the timing pulse signals is disclosed hereinafter.

In FIG. 22, one embodiment of means for producing the timing pulse signal is shown. This means comprises, as are shown by dotted lines, a reference carrier wave producing circuit V for generating an alternating-current signal which has the same frequency and one of the same quantum-phases as those of said input carrier wave of the timing pulse signal, a phase difference detecting circuit VI for detecting phase deviation between the timing pulse of the demodulation apparatus and the timing information transmitted from the other party by the use of output signals of the circuit V, and a timing pulse generating circuit VII for producing timing pulses by utilizing the output signal of the circuit VI.

The embodiment shown in FIG. 22 is described referring to FIGS. 23(A), (B) and (C) in which references by numerals correspond to waves designated in FIG. 22. Input carrier waves for the timing information are applied to an input terminal 309 as is shown by a wave (1) which is phase-modulated alternately so as to have 0, phase and $\pi$ phase every telegraphic code element. Transition instants of this wave (1) synchronize with the transition instants of all phase-modulated carrier waves of the information channels. This input carrier wave (1) is phase-demodulated in a phase demodulator 313, by the use of a reference carrier wave (2) which will be described in detail hereinafter, whereby demodulated signal (3) is applied to gate circuits 314 and 315 respectively. The gate circuits 314 and 315 are respectively controlled by gating signals (4) and (11) which have a duration equal to the duration T and are disposed symmetrically, with respect to a substantially center instant of each code element, and to each other. In this case, the initial transition instants and the terminal transition instants of the gating signals (4) and (11) are synchronized with the transition instants of input carrier wave (1). Gated signals (5) and (12) are respectively applied to integrators 316 and 317 which are reset by a pulse signal (6), then start and continue the integrating operation during the application of these input signals (5) and (12), the integrating operation being terminated at the instant when said signals (5) and (12) are cut off. After that, integrators 316 and 317 maintain respectively values obtained at the instant of termination of the integrating operation until the application of the pulse signal (6). Accordingly, signals (8) and (13) are produced at the output side of the integrators 316 and 317, which are respectively sampled in sampling circuits 318 and 319 by the use of a sampling pulse (7), whereby sampled pulses (9) and (14) are respectively produced at output sides of circuits 318 and 319. Since rectifying elements 320 and 321 are set so as to pass therethrough, respectively, positive pulses and negative pulses, the pulses (9) and (14) are passed, respectively, the rectifying elements 320 and 321 as are shown by (10) and (15), and then superposed in a combiner 322. A signal (16) which is a different component between said pulses (10) and (15) is derived from the combiner 322 and then applied to, through a low pass filter 323, an oscillator 324 the frequency of which is controlled by the input voltage. By the use of the output signal of this oscillator 324, pulse signals (4), (6), (7), (11), etc., are produced in a pulse generator 325.

When the pulses (4), (7) and (11) are not synchronized with the timing information of the input carrier wave (1), operation of these circuits become as is shown in FIG. 23(B), which corresponds to the case in which the phases of the pulses (4), (6), (7) and (11), etc., are stepped "forward" from the transition instant of the input carrier wave (1). As is shown in FIG. 23(B), the output pulses (10) of the rectifier 320 have smaller amplitude than that of the output pulse (15) of the rectifier 321 whereby the output pulse (16) is obtained in the negative polarity. By utilizing this pulse signal (16), the phase of the output signal of the oscillator 324 is restored to the correct condition. On the other hand, when the phase of the output signal of the oscillator 324 is stepped "backward," the pulse signal (16) is obtained in the positive polarity.

The reference carrier wave producing circuit V will now be disclosed. In this circuit V, the input carrier wave (1) is applied to a phase demodulator 328. On the other hand, the output signal of the oscillator 333 is passed through a phase shifter 326 of $\pi/4$, and a phase modulator 327 controlled by a signal (17), and is then applied to the phase demodulator 328 as is shown by a signal (18). The output signal of the phase demodulator 328 is passed through a gate circuit 329, an integrator 330, a sampling circuit 331 and a low pass filter 332 and then introduced to the oscillator 333 the frequency of which is controlled by the voltage of its input signal. Operation of this case is illustrated in FIG. 23(C), wherein signals (20), (21) and (22) have no components for adjusting the frequency of the oscillator 333, because FIG. 23(C) corresponds to a synchronized condition with respect to the phases of the waves (1) and (2); in other words, the waves (1) and (18) have a phase difference of $\pi/4$ to each other. In accordance with the deviation of the phase of the wave (2), signals (20), (21) and (22) have components sufficient to adjust the phase of the oscillator 333.

In this embodiment, the durations of the gating signals (6) and (23) are set to the duration T seconds, whereby undesirable signals are not generated at the output side of integrators 316, 317 and 329 according to the same principle as mentioned above. If the frequency of the wave (2) is not equal to the input carrier wave (1), at first, the output signal of the demodulator 313 becomes as is shown in FIG. 23(D). However, the phase correcting operation of the circuit VI and VII are carried out irrespectively of non-synchronization of the frequencies of waves (1) and (2), and thereafter the frequency of the wave (2) is caused to be equal to the frequency of the wave (1) by the function of the circuit V.

In the manner mentioned above, timing pulse signals (23), (24) and (25) are maintained in the correct phase position continuously. By the use of these timing pulses (23), (24) and (25), the integrators of the circuit I in all demodulation apparatus can carry out correct operation thereof. Practical operation thereof is described referring to FIGS. 24(A) and 24(B).

In the above-mentioned demodulation apparatus, integrators are described, for the simple illustration and description, so as to have only one integrating means having the reset-and-start function. The integrator of the demodulation circuit I, however, can be composed practically of a gating means and an integrating means. Normal construction in such case is shown in FIG. 24(A), which comprises a phase-demodulator 335, a gating circuit 336, an integrating circuit 337 and a sampling circuit 338. Waves (1) to (9) shown in FIG. 24(B) correspond to signals designated in the respective positions in FIG. 24(A). For a simple illustration, it is assumed that an input wave (1) phase-modulated 0 phase $\pi$ phase alternately is demodulated by the use of a reference carrier wave (2) having a constant phase position. Waves (4), (6) and (8) are respectively equivalent to waves (23), (24) and (25, in FIGS. 22 and 23(C). The detection signal (3) is passed through the gating circuit 336 controlled by the gating signal (4) the duration of which is slightly shorter than the duration of the code element and equal to an integrating duration of the circuit 337, which is operated as shown by (7) so as to reset the integrated amount thereof every application instant of the timing pulse (6) and to last the integrating operation until the termination of its input signal and moreover to maintain the integrated amount of the termination instant. This integrated-and-maintained amount is sampled, by the sampling pulse (8), in the sampling circuit 338, thereby obtaining an output pulse signal (9) at the terminal 339. Since the integrating duration of the integrating circuit 337 is correctly selected as the duration T seconds, undesirable components with respect to the adjacent carrier waves do not obstruct the correct detection in the samping circuit 338. Moreover, the gating period by the wave (4) is set at the medium position except portions near the transition instant, whereby obstructive phenomena, such as transients produced at the phase-transition instants in the carrier wave, are eliminated almost completely.

As described above, in this invention, the reference standard carrier wave in the demodulation apparatus for phase-modulated waves is not produced by such a system in which the phase of the received signal is stored in the alternating state as in the case of the Kineplex System, but the reference standard carrier wave is produced by controlling, by utilizing a demodulated direct current component, the phase of the output wave of an oscillator which generates the same frequency as the receiving signal and which is provided at a receiving set. Accordingly, in the demodulation apparatus of this invention, particular circuit elements are not necessary, strict regulation of the feedback amount of the negative feedback circuit is not necessary, and also complex control pulses are not necessary, differing from the Kineplex System. Furthermore, reference standard carrier waves which are only slightly affected by a noise in the transmission line can be obtained, so that phase-modulated telegraphic waves can be demodulated in a very stable manner. According to the above-mentioned characteristic features of this invention, it is clear that this invention relates to a very effective demodulation apparatus relating to phase-modulated telegraphic waves capable of transmitting an information near the maximum transmission quantity in obedience to the information theory, by skillfully utilizing a defined frequency band.

Since it is obvious that many changes and modifications can be made in the above described details without departing from the nature and spirit of the invention, it is to be understood that the invention is not to be limited to the details described herein except as set forth in the appended claims.

What we claim is:

1. A demodulation apparatus for a phase-modulated telegraphic signal having multiple phase positions each of which is determined in accordance with polarity of a telegraphic code to be transmitted and using a phase position of an immediately preceding unit code element of reference, which comprises, a demodulation circuit generating a demodulated signal corresponding to said telegraphic signal comprising first terminal means for receiving said phase-modulated signal, second terminal means for receiving a reference carrier wave, a phase detector for detecting a magnitude and sign of a difference between phase positions of said telegraphic signal applied thereto from said first terminal means and said reference carrier wave applied thereto from said second terminal means and of the same frequency as said telegraphic signal, said phase detector comprising a ring modulator having an output comprising a direct current voltage, an integrator connected to said phase detector for integrating the direct-current voltage of the output of the ring modulator at every unit code element of said telegraphic signal and producing an integrated signal successively having a plus or minus polarity according to the sign of said difference, pulse means receptive of said integrated signal for transforming the integrated signal into a pulse signal of plus or minus polarity successively in accordance with the polarity of said integrated signal, said pulse means comprising a differentiator, third terminal means receptive of said pulse signal, an automatic control circuit producing an alternating-current signal having a stable frequency corresponding to the frequency of said telegraphic signal, a phase memory circuit receptive of the output of said third terminal means for successively storing during every unit code element of said telegraphic signal the phase position of the immediately preceding unit code element in response to said pulse signal, and a regulation circuit disposed between said automatic control circuit and the second terminal means to be controlled by an output signal of the phase memory circuit and regulating the phase of the alternating-current signal of the automatic control circuit to apply to said second terminal means the reference carrier wave having a phase position synchronized with the phase position of the immediately preceding unit code element, whereby the demodulation circuit generates correctly said demodulated signal corresponding to said telegraphic signal.

2. A demodulation apparatus according to claim 1, in which said demodulation circuit comprises a ring modulator having an output comprising a direct current voltage and detecting a magnitude and sign of a difference between phase position of said telegraphic signal and said reference carrier wave of the same frequency as said telegraphic signal, said integrator integrating said direct-current voltage of the output of the ring modulator at every unit code element of said telegraphic signal and producing and integrated signal successively having a plus or minus polarity according to the sign of said difference, and a sampling circuit connected to said integrator.

3. A demodulation apparatus according to claim 1, in which said demodulation circuit comprises $\underline{2^{n-1}}$ demodulation circuits receiving a phase-modulated signal having $\underline{2^n}$ number of multiple phase positions for transmitting $n$ number of telegraphic channels.

4. A demodulation apparatus according to claim 3, in which said automatic control circuit comprises a first frequency multiplier increasing by $\underline{2^n}$ times the frequency of the telegraphic signal having $\underline{2^n}$ number of multiple phase positions determined in the number of telegraph channels $n$, a second ring modulator phase-modulating the output signal of the first frequency multiplier and having an output, a second integrating circuit integrating the output signal of the second ring modulator, an oscillator having a reactance control circuit and the oscillation frequency of which is controlled by the output of the second integrating circuit so as to be equal to that of the telegraphic signal, a second frequency multiplier increasing by $\underline{2^n}$ times, the frequency of the output signal of the oscillator and generating an output signal applied to the second ring modulator thereby controlling the phase modulation of the second ring modulator.

5. A demodulation apparatus according to claim 3, in which said automatic control circuit comprises a difference detecting means detecting the difference between the amplitude of the output pulses of the demodulation circuits and having an output signal, an integrating circuit integrating the output signal of the difference detecting means, and an oscillator having a reactance control circuit the oscillation frequency of which is controlled by the output of the integrating circuit so as to be equal to that of the telegraphic signal.

6. A demodulation apparatus according to claim 3, in which said phase memory circuit comprises a plurality of combination circuits, each composed of a rectifying element and a bistable circuit, and auxiliary circuits causing the bistable circuits to store a quantum phase of the immediately preceding code element transmitted in the state of one combination of the stable states of the bistable circuits.

7. A demodulation apparatus according to claim 3, in which said demodulation circuits are arranged in parallel for receiving a plurality of parallel phase-modulated telegraphic signals arranged relative to one another at frequency spacings each of which is slightly longer than a reciprocal of each integration duration of said integrator of said phase demodulation circuit.

8. A demodulation apparatus according to claim 7, in which said integrators of the demodulation circuits comprise means responsive to timing information transmitted through one of said phase-modulated telegraphic signals for producing timing pulses.

9. A demodulation apparatus according to claim 1, in which said integrator of said demodulation circuit comprises gating means, integrating means connected in cascade with said gating means to integrate the output voltage of said gating means, fourth terminal means for applying to said gating means a gating signal having a duration slightly shorter than the duration of a unit code element of the input telegraphic signal, and fifth terminal means for applying a timing pulse signal to the integrating means to reset integration operation of said integrating means.

10. A demodulation apparatus according to claim 1, in which said phase memory circuit comprises a rectifying element rectifying the output of the demodulation circuit and a bistable circuit the state of which is reversible by the output of said rectifying element, whereby the bistable circuit is established in a state corresponding to one of two states in accordance with the polarity of the output pulses of the demodulation circuit.

11. A demodulation apparatus according to claim 1, in which said regulation circuit comprises a ring modulator.

12. A demodulation apparatus for a phase-modulated telegraphic wave having multiple phase positions each of which is determined in accordance with polarity of a telegraphic code to be transmitted and by use of a phase position of an immediately preceding unit code element of reference, which comprises, a demodulation circuit generating a demodulated signal corresponding to said telegraphic wave comprising a first terminal means for applying a received telegraphic wave to said demodulation circuit, second terminal means for applying a reference carrier wave of the same frequency as said telegraphic wave to said demodulation circuit, a phase detector for detecting magnitude and sign of a difference between phase positions of the telegraphic wave applied by said first terminal means and the reference carrier wave applied by said second terminal means and having a direct-current output, an integrator integrating said direct-current voltage output of the phase detector at every unit code element of said telegraphic signal for producing an integrated signal successively having a plus or minus polarity according to the sign of said difference, pulse means transforming the integrated signal into pulses, third terminal means receiving said pulses of plus or minus polarity successively in accordance with the polarity of said integrated signal, an automatic control circuit producing an alternating-current signal having a stable frequency corresponding to the frequency of the telegraphic wave to apply to the second terminal means, a phase memory circuit receiving an output of said third terminal means successively storing during every unit code element of said telegraphic wave the phase position of the immediately preceding unit code element in response to said pulses, and a regulation circuit controlled by an output signal of the phase memory circuit and connected before said first terminal means regulating the phase of the phase-modulated telegraphic signal thereby applying to said first terminal means said telegraphic wave having fixed phase positions corresponding respectively to polarity of the telegraphic code transmitted, whereby the demodulation circuit generates a correctly demodulated signal corresponding to said telegraphic wave.

13. A demodulation apparatus as claimed in claim 12, in which said demodulation circuit comprises $\underline{2^{n-1}}$ number of parallel circuits receiving a phase-modulated signal having a $\overline{2^n}$ number of multiple phase positions, and said phase-modulated signal transmitting $n$ number of telegraphic channels.

14. A demodulation apparatus for a phase-modulated telegraphic wave having multiple phase positions each of which is determined in accordance with polarity of a telegraphic code to be transmitted and by use of a phase position of an immediately preceding unit code element of reference, which comprises, a demodulation circuit having first terminal means and second terminal means and comprising a phase detector for detecting a magnitude and sign of a difference between phase positions of said telegraphic wave applied to said first terminal means and a reference carrier wave applied to said second terminal means, said reference carrier wave having the same frequency as said telegraphic wave, an integrator for integrating a direct-current voltage output of the phase detector at every unit code element of said telegraphic wave and producing an integrated signal successively having a plus or minus polarity according to the sign of said difference, and pulse means for transforming the integrated signal into pulses, third terminal means to which said pulses are applied having plus or minus polarity successively in accordance with the polarity of said integrated signal; an automatic control circuit for producing an alternating-current signal having a stable frequency corresponding to the frequency of the telegraphic wave to apply to the second terminal means; regulation means connected to the third terminal means to regulate the polarity of the pulses obtaining at the third terminal means; a phase memory circuit for successively storing, during every unit code element of said telegraphic wave, the phase of the immediately preceding unit code element in response to an output signal of said regulation means, connections connecting the phase memory circuit for controlling the regulation circuit so as to generate a correctly demodulated signal corresponding to said telegraphic wave.

15. A demodulation apparatus as claimed in claim 14, in which said demodulation circuit comprises a $2^{n-1}$ number of parallel circuits receiving a phase-modulated wave having a $2^n$ number of multiple phase positions, and said phase-modulated wave transmitting *n* number of telegraphic channels.

References Cited

UNITED STATES PATENTS

| | | | |
|---|---|---|---|
| 2,905,812 | 9/1959 | Doelz et al. | 325—47 |
| 2,984,701 | 5/1961 | Barry | 178—66 |
| 3,060,383 | 10/1962 | Halina | 329—50 |
| 3,135,919 | 6/1964 | Heald | 325—346 X |
| 3,206,681 | 9/1965 | Brown | 325—321 |
| 3,289,082 | 11/1966 | Shumate | 325—30 |
| 3,290,440 | 12/1966 | Easton et al. | 178—67 |

JOHN W. CALDWELL, *Acting Primary Examiner.*

DAVID G. REDINBAUGH, *Examiner.*

W. S. FROMMER, S. J. GLASSMAN, *Assistant Examiners.*